(12) United States Patent
Hafenrichter et al.

(10) Patent No.: US 11,802,023 B2
(45) Date of Patent: Oct. 31, 2023

(54) ATTACHMENT UNITS ENGAGEABLE BY CLASP ASSEMBLIES AND METHODS OF SECURING ATTACHMENT UNITS TO OBJECTS

(71) Applicant: THE BOEING COMPANY, Chicago, IL (US)

(72) Inventors: Joseph L Hafenrichter, Seattle, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 755 days.

(21) Appl. No.: 16/861,374

(22) Filed: Apr. 29, 2020

(65) Prior Publication Data

US 2020/0407197 A1    Dec. 31, 2020

Related U.S. Application Data

(63) Continuation-in-part of application No. 16/455,854, filed on Jun. 28, 2019, now Pat. No. 11,319,070.

(51) Int. Cl.
*B66C 1/04* (2006.01)
*B66C 1/10* (2006.01)
*B66C 13/16* (2006.01)

(52) U.S. Cl.
CPC .................. *B66C 1/04* (2013.01); *B66C 1/10* (2013.01); *B66C 13/16* (2013.01)

(58) Field of Classification Search
CPC ........... B64D 1/22; B64C 39/024; B66C 1/28; B66C 1/66

USPC .......................................... 294/2, 82.33, 212
See application file for complete search history.

(56) References Cited

U.S. PATENT DOCUMENTS

| | | | | |
|---|---|---|---|---|
| 4,309,011 A | * | 1/1982 | Spector | A47G 1/20 248/205.3 |
| 5,125,601 A | * | 6/1992 | Monford, Jr. | B64G 1/641 901/30 |
| 5,258,647 A | * | 11/1993 | Wojnarowski | H01L 24/75 257/E23.178 |
| 6,872,439 B2 | * | 3/2005 | Fearing | B81B 3/0059 264/222 |
| 9,016,634 B1 | * | 4/2015 | Ratner | B64D 1/12 244/137.4 |
| 9,704,126 B1 | * | 7/2017 | Wellman | B25J 15/0014 |
| 10,249,200 B1 | * | 4/2019 | Grenier | G05D 1/0094 |

(Continued)

FOREIGN PATENT DOCUMENTS

| EP | 3228577 | 10/2017 |
|---|---|---|
| JP | H10305989 | 11/1998 |

(Continued)

OTHER PUBLICATIONS

U.S. Appl. No. 16/202,347, filed Nov. 28, 2018.

(Continued)

*Primary Examiner* — Paul T Chin
(74) *Attorney, Agent, or Firm* — The Small Patent Law Group LLC; Joseph M. Butscher

(57) ABSTRACT

An attachment unit is configured to secure to an object, such as cargo. The attachment unit includes one or more portions that are configured to secure to the object. The one or more portions are further configured to one or both of mechanically or magnetically removably couple to a clasp assembly.

23 Claims, 15 Drawing Sheets

(56) References Cited

U.S. PATENT DOCUMENTS

| | | | |
|---|---|---|---|
| 10,773,930 B2* | 9/2020 | Shin | B66C 1/38 |
| 10,914,332 B1* | 2/2021 | Jacquemin | B63B 21/50 |
| 2015/0158587 A1* | 6/2015 | Patrick | B64D 1/12 |
| | | | 701/3 |
| 2018/0099748 A1* | 4/2018 | Lesperance | B64D 1/02 |
| 2018/0354625 A1 | 12/2018 | Verkade | |
| 2019/0010031 A1* | 1/2019 | Humble | B66D 1/505 |
| 2019/0061944 A1* | 2/2019 | Zvara | B64D 1/22 |
| 2019/0072953 A1* | 3/2019 | Maheshwari | B64C 39/024 |
| 2019/0135437 A1* | 5/2019 | Halevy | B64D 1/12 |
| 2019/0152600 A1* | 5/2019 | Kuk | B64D 1/22 |
| 2020/0172244 A1* | 6/2020 | Green | B64C 39/024 |
| 2020/0207474 A1* | 7/2020 | Foggia | G05D 1/0676 |

FOREIGN PATENT DOCUMENTS

| | | |
|---|---|---|
| JP | 2014091413 | 5/2014 |
| WO | WO 2018/234670 | 12/2018 |

OTHER PUBLICATIONS

U.S. Appl. No. 16/216,096, filed Dec. 11, 2018.
Extended European Search Report for EP 20175479.3-1010, dated Nov. 16, 2020.

* cited by examiner

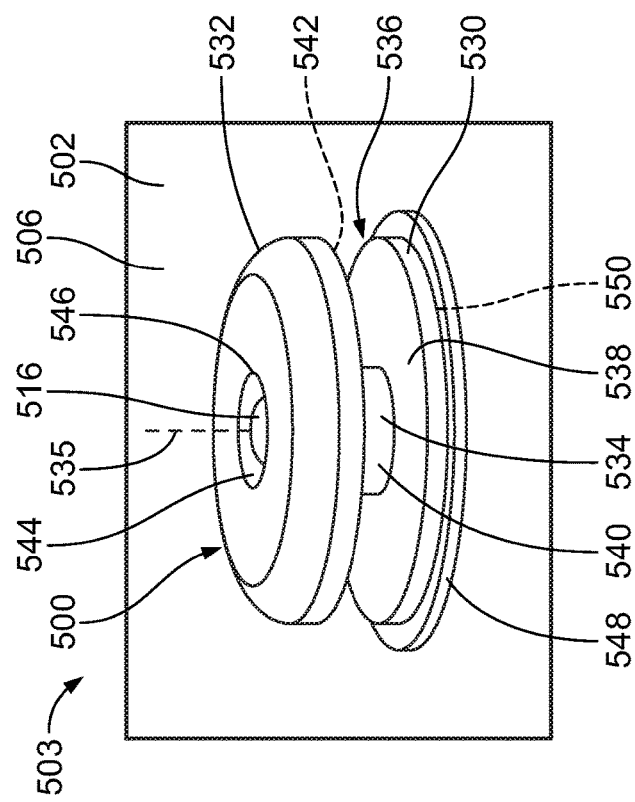

ATTACHMENT UNITS ENGAGEABLE BY CLASP ASSEMBLIES AND METHODS OF SECURING ATTACHMENT UNITS TO OBJECTS

RELATED APPLICATIONS

This application is a continuation-in-part of U.S. patent application Ser. No. 16/455,854, entitled "Deployable Clasping Systems and Methods," filed Jun. 28, 2019, now U.S. Pat. No. 11,319,070, which is hereby incorporated by reference in its entirety.

FIELD OF EMBODIMENTS OF THE DISCLOSURE

Embodiments of the present disclosure generally relate to attachment units that are configured to be engaged by clasp assemblies, such as those of clasping systems, and methods of securing attachment units to objects.

BACKGROUND OF THE DISCLOSURE

Various recovery systems include a cable having a hook that is used to grasp onto an object. The cable and hook are typically maneuvered by a recovery operator into a position where the hook is secured to the object. The recovery operator manipulates the hook to secure the hook to the object. Once the hook is secured to the object, the cable may be hoisted upwardly to lift and move the object. Notably, the task of maneuvering the hook and latching onto the object may require substantial training and skill.

In tactical situations, a soldier may need to be recovered from a particular position. For example, the soldier may be wounded or stranded on a field of battle or behind enemy lines. However, the soldier may not be able to grasp a recovery hook or other such structure, such as deployed from a helicopter, in order to be airlifted from the field. Accordingly, a recovery crew may be sent to the location of the wounded soldier and deployed thereto in order to airlift the soldier to safety.

As can be appreciated, the recovery crew may be at risk at the location, such as if hostile adversaries are present. In general, a recovery crew may be endangered on various recovery missions. In certain instances, the recovery mission may be delayed if a danger to the recovery crew is determined to be excessive. Moreover, recovery hooks deployed from helicopters may be susceptible to getting stuck in jungle canopies, canyon crevices, urban alleyways, and the like.

Further, unmanned aerial vehicles (UAVs) are increasingly being used to deliver packages. However, the UAVs typically securely connect or otherwise couple to the packages through costly and complicated securing assemblies and methods.

SUMMARY OF THE DISCLOSURE

A need exists an effective and efficient system and method that allow for removable coupling between an object, such as a package or container, and a delivery device, such as a clasp assembly, grappling member, or the like of a UAV. Further, a need exists for a low cost, mass manufacturable, simple-to-use, and easy-to-integrate device for removably coupling an object to a delivery device.

With those needs in mind, certain embodiments of the present disclosure provide an attachment unit configured to secure to an object. The attachment unit includes one or more portions that are configured to secure to the object. The one or more portions are further configured to one or both of mechanically or magnetically removably couple to a clasp assembly. As an example, the object is cargo.

In an embodiment, the one or more portions include a main body that is configured to secure to the object through an adhesive. The main body is configured to magnetically couple to a magnetic hitch of the clasp assembly.

In at least one embodiment, the attachment includes a guidance member. The guidance member is one or both of a guidance signal emitter or a guidance signal reflector.

In an embodiment, the one or more portions include a base configured to secure to the object, a knob, and a neck that connects the base to the knob. An undercut region is formed between the base, the knob, and the neck. As an example, the base is configured to secure to the object through an adhesive.

A guidance member may be coupled to the knob. The guidance member may be recessed within a central divot formed in the knob.

The undercut region is configured to receive couplers of the clasp assembly.

In at least one embodiment, one or more strap slots are formed within the base. The one or more strap slots are configured to receive and retain one or more portions of one or more straps. One or ramped surfaces having retainer barbs lead into the one or more strap slots. The attachment unit is configured to be rotated to secure the one or more portions of the one or more straps within the one or more strap slots.

In an embodiment, the one or more portions are integrally formed with the object. In an embodiment, an upper surface of the attachment unit is within or below a plane in which an outermost upper surface of a top surface of the object resides.

In at least one embodiment, the one or more portions are configured to secure to the cargo via one or more straps.

In an embodiment, the one or more portions include a platform, and one or more flanges outwardly extending from an outer perimeter of the platform. The one or more flanges include an angled arm connected to a support beam. The angled arm downwardly disposes the support beam from the platform. A distal end of the support beam includes a ramped surface having a retaining barb. The attachment unit is configured to be rotated in relation to one or more straps so that one or more portions slide into strap slots to secure the attachment unit to the one or more straps.

Certain embodiments of the present disclosure provide a method of securing an attachment unit to an object and a clasp assembly. The method includes securing one or more portions of the attachment unit to the object, and one or both of mechanically or magnetically removably coupling the one or more portions to the clasp assembly.

Certain embodiments of the present disclosure provide a transportable system including an object, and an attachment unit secured to the object. The attachment unit includes one or more portions secured to the object. The one or more portions are further configured to one or both of mechanically or magnetically removably couple to a clasp assembly.

BRIEF DESCRIPTION OF THE DRAWINGS

FIG. 15 illustrates a perspective top view of an attachment unit secured to cargo, according to an embodiment of the present disclosure.

FIG. 16 illustrates a perspective top view of the attachment unit of FIG. 15 secured to a top surface of the cargo.

FIG. 17 illustrates a perspective top view of an attachment unit secured to a top surface of the cargo, according to an embodiment of the present disclosure.

DETAILED DESCRIPTION OF THE DISCLOSURE

Figure 1:
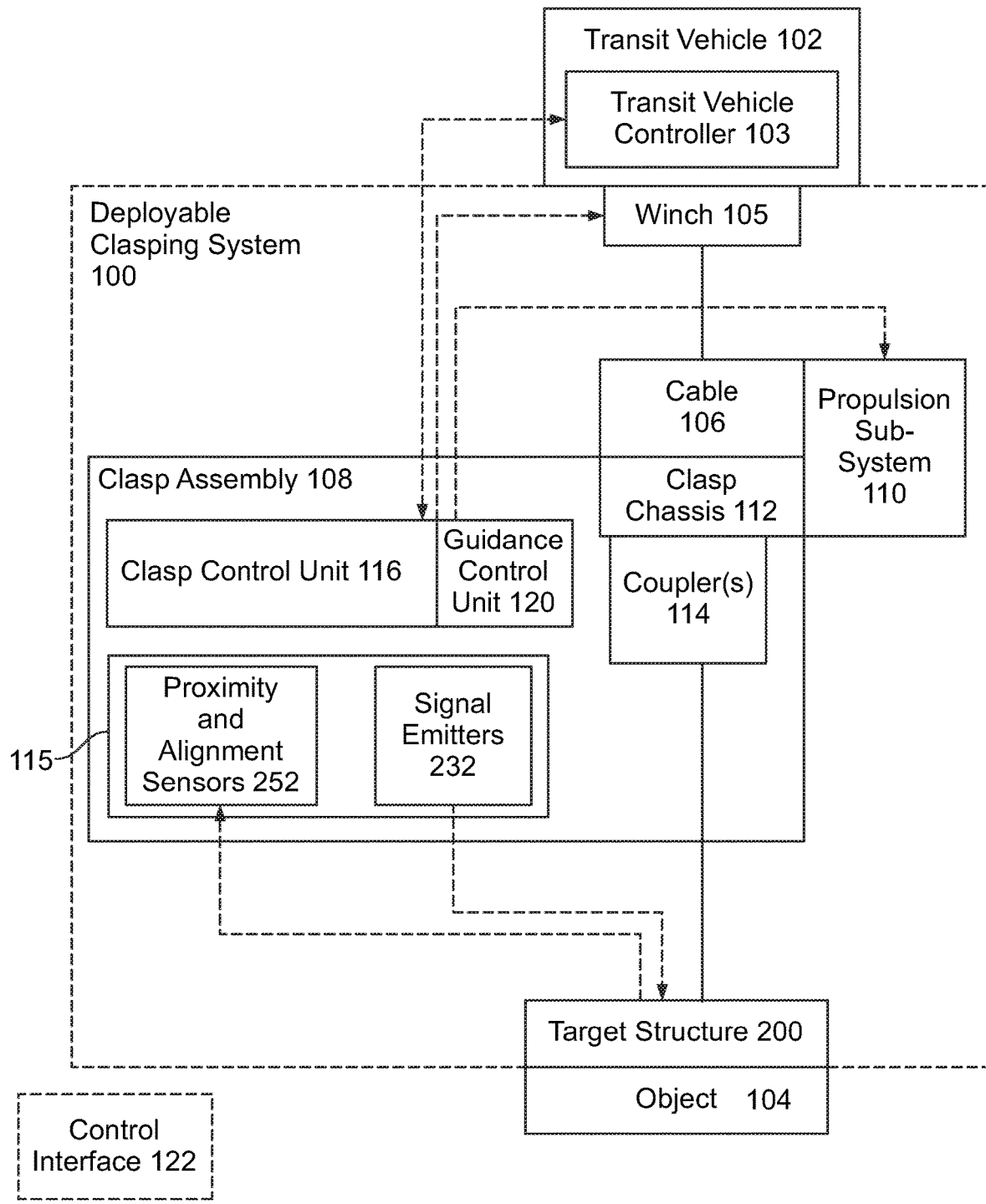
FIG. 1 illustrates a schematic block diagram of a deployable clasping system of a transit vehicle that is used to securely clasp and release an object, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a deployable clasping system that is used with a transit vehicle, such as an aircraft (for example, a helicopter, and unmanned aerial vehicle (UAV), a crane, or the like). The deployable clasping system is configured to grasp and lift an object to be recovered and/or be inserted into a location. The object may be an individual (such as a wounded soldier or civilian or animal in need of rescue), or various non-living objects, such as a beam to be positioned during a construction, an improvised explosive device, or the like. The deployable clasping system includes a cable that is configured to be selectively deployed from the transit vehicle. A propulsion sub-system is used to maneuver a clasp assembly to the object. The clasp assembly includes one or more couplers that are configured to securely couple to the object. A clasp control unit controls operation of the propulsion sub-system and the clasp assembly. In at least one embodiment, a clasp control unit and/or a guidance control unit is used to automatically maneuver the clasp assembly, via the propulsion sub-system, to the object. For example, the guidance control unit may be used to control guidance to the object.

In at least one embodiment, a controller of a transit vehicle controls the transit vehicle into a vicinity of an object. Subsequently, the clasp control unit controls a winch to vertically maneuver a clasp assembly, and also a propulsion sub-system to horizontally maneuver the clasp assembly, in order to clasp onto the object, and/or a target structure on the object.

Certain embodiments of the present disclosure provide a mechanism for rapid attachment and detachment of an object (such as a package, container, belt, harness, or other such article) from a device, such as an aircraft (for example, an unmanned aerial vehicle (UAV), a crane, or the like). Certain embodiments of the present disclosure provide attachment units that are coupled to an object (such as a container, package, box, and/or the like). The attachment units are configured to be removably coupled by a device, such as a clasp assembly, which may be connected to a delivery system, such as a UAV. The attachment units are low cost and readily manufacturable. The attachment units can be mechanically, magnetically, electromagnetically, and/or electro-permanent-magnetically secured to a clasp assembly, for example. Embodiments of the present disclosure provide attachment units that may be disposable, and configured to be quickly and easily attached to objects.

In at least one embodiment, a rotatable or twistable attachment unit includes a plurality of flanges for receiving a plurality of cables, wires, straps, ropes, or the like surrounding a structure, such as a package, box, or other container. The plurality of flanges are disposed along a peripheral edge of the attachment unit and include a ridge element (such as a barbed retainer).

Certain embodiments of the present disclosure provide an attachment unit that configured to secure to an object. The attachment unit includes one or more portions that are configured to secure to the object, and one or both of mechanically or removably coupled to a clasp assembly. The clasp assembly may actively or passively coupled to the attachment unit.

FIG. 1 illustrates a schematic block diagram of a deployable clasping system 100 of a transit vehicle 102 that is used to securely clasp and release an object 104, according to an embodiment of the present disclosure. The transit vehicle 102 may be a crane, an aircraft (such as a helicopter, or a UAV), or the like. The object 104 may be a non-living, inanimate object, such as a construction material (for example, a beam, block, frame, wall, or the like), a vehicle, a container, package, box, or the like of material(s), or various other items to be lifted and extracted from a location and/or delivered to another location. As another example, the object 104 may be an individual, such as a wounded solder or civilian in need of rescue.

The transit vehicle 102 is an example of a component from which the deployable clasping system 100 is deployed. The component may be a vehicle, or optionally may be fixed to a structure, such as a crane mounted to a building (such as used for construction).

The deployable clasping system 100 includes a cable 106 that is configured to be deployed from a portion of the transit vehicle 102. The transit vehicle 102 includes one or more transit vehicle controller(s) 103 that controls operation of the transit vehicle 102. The transit vehicle 102 may also include a winch 105 on which the cable 106 is spooled, and which is used to selectively spool and unspool the cable 106. The winch 105 may be controlled by the transit vehicle controller (s) 103. A clasp assembly 108 is coupled to (for example, mounted to) the cable 106. For example, the clasp assembly 108 is secured to a distal end of the cable 106. In at least one embodiment, a propulsion sub-system 110 is coupled to (for example, mounted on or otherwise to) the clasp assembly 108 and/or the cable 106. For example, the propulsion sub-system 110 may be directly mounted onto the clasp assembly 108 and/or the cable 106. Alternatively, the deployable clasping system 100 may not include the propulsion sub-system 110.

The clasp assembly 108 includes a clasp chassis 112 and one or more couplers 114 operatively coupled to the clasp chassis 112. For example, the couplers 114 are one or more of grasping arms, latches, clamps, hooks, jaws, or the like.

In at least one embodiment, the propulsion sub-system 110 includes one or more propellers (for example, fans), engines, and/or or the like. In at least one other embodiment, the propulsion sub-system 110 includes a compressed gas storage vessel (such as a tank, bottle, or the like) and nozzles coupled thereto. Optionally, the propulsion system 110 may include pressurized liquid or rocket thrusters.

In at least one embodiment, the deployable clasping system 100 may also include a guidance device 115, which may be in communication with a guidance control unit 120 that is configured to navigate and/or guide movement of the clasp assembly 108 to the object 104. For example, the guidance device 115 may be or otherwise includes one or more sensors 252, such as alignment sensors and/or proximity sensors, such as a video camera, an ultrasonic device, an infrared imaging device, a laser device, or the like that is configured to receive and/or emit guidance signals in relation to the object 104 in order to guide the clasp assembly 108 to the object 104. Alternatively, the deployable clasping system 100 may not include the guidance device 115.

In at least one embodiment, a signal emitter 232 is disposed on the clasp assembly 108. A target structure 200 on the object 104 may include a reflector. The signal emitters 232 emit signals that are reflected off the reflector, and detected by the sensor(s) 252 to locate the target structure 200, thereby allowing the clasp assembly 108 to align with and close in on the target structure. In at least one embodiment, the target structure 200 is an attachment unit secured to the object 104.

In at least one embodiment, the deployable clasping system 100 includes a clasp control unit 116 in communication with the propulsion sub-system 110 and the clasp assembly 108, such as through one or more wired or wireless connections. For example, the clasp control unit 116 may be onboard the transit vehicle 102 and in communication with the propulsion sub-system 110 and the clasp assembly 108 through electrical wires that extend through the cable 106 or via wireless connections. In at least one other embodiment, the clasp control unit 116 is positioned on or within the propulsion sub-system 110 or the clasp assembly 108. In at least one other embodiment, the clasp control unit 116 is remotely located from the transit vehicle 102, the cable 106, the propulsion sub-system 110, and the clasp assembly 108.

In at least one embodiment, the deployable clasping system 100 may also include a guidance control unit 120 in communication with the guidance device 115. The guidance control unit 120 may be part of the clasp control unit 116. Alternatively, the guidance control unit 120 may be separate and distinct from the clasp control unit 116. The guidance control unit 120 receives guidance signals output by the guidance device 115 to guide movement of the clasp assembly 108, via the propulsion sub-system 110, to the object 104. In at least one embodiment, the guidance control unit 120 is housed within the guidance device 115. In at least one other embodiment, the guidance control unit 120 is mounted to or within the transit vehicle 102. In at least one embodiment, the guidance control unit 120 is part of the clasp control unit 116. For example, the clasp control unit 116 and the guidance control unit 120 may form a unitary control unit.

In operation, the transit vehicle 102 is maneuvered towards the object 104. The cable 106 is deployed from the transit vehicle 102. For example, the cable 106 may be unspooled, dropped, or otherwise deployed from a portion of the transit vehicle 102. The guidance device 115 (which includes the sensors 252 and the signal emitters 232) emits and/or receives guidance signals in relation to the object 104. For example, the guidance device 115 may emit, receive, and/or acquire images, laser beams, ultrasonic signals, infrared signals, and/or the like in relation to the object 104. The guidance control unit 120 receives the guidance signals, which are output by the guidance device 115. The guidance control unit 120 analyzes the guidance signals to determine a location of the object 104. The clasp control unit 116 cooperates with the guidance control unit 120 to operate the propulsion sub-system 110 to maneuver the clasp assembly 108 and/or the cable 106 so that the clasp assembly 108 is proximate and/or contacting the object 104. For example, the propulsion sub-system 110 and the clasp assembly 108 receive control signals output by the clasp control unit 116 that control operation of the propulsion sub-system 110 and the clasp assembly 108.

When the clasp assembly 108 is proximate to (such as on or within a predetermined distance, such as 1 foot) the object 104, the clasp control unit 116 operates the clasp assembly 108 so that the coupler(s) 114 securely couple to (for example, grasp) the object 104. After the coupler(s) 114 securely couple to the object 104, the object 104 may be lifted and removed, such as via the transit vehicle 102 retracting the cable 106 and/or otherwise moving the object 104. In this manner, the deployable clasping system 100 may automatically locate the object, such as via the guidance device 115 and the guidance control unit 120, guide the clasp assembly 108 onto the object via the propulsion sub-system 110 as controlled by the clasp control unit 116, and securely clasp the object 104 via the clasp assembly 108 without human intervention.

In at least one embodiment, the deployable securing system 100 does not include the guidance device 115 and the guidance control unit 120. Instead, an optional control interface 122 may be used by an operator to maneuver the clasp assembly 108 onto the object 104, via the propulsion sub-system 110 and the cable 106 (operation of which is controlled by the clasp control unit 116). The control interface 122 may include one or more engagement devices, such as buttons, switches, joysticks, a touchscreen interface, knobs, wheels, and/or the like that allow an individual to maneuver the clasp assembly 108 onto the object 104 and securely clasp the object 104 via the coupler(s) 114.

In at least one embodiment, the transit vehicle controller 103 communicates with the clasp control unit 116 that the transit vehicle 102 is in the vicinity of the object 104. The clasp control unit 116 then communicates with signal emitters 232 to send impulses toward the object 104. The proximity and alignment sensors 252 receive returning impulses, and communicate these signals to the clasp control unit 116. The clasp control unit 116 then processes the returned impulse signals to determine a distance and direction in relation to the clasp assembly 108 and the object 104.

In at least one embodiment, the clasp control unit 116 operates the winch 105 and the propulsion sub-system 110 to maneuver the clasp assembly 108 to the object 104. Such steps are repeated until the clasp control unit 116 receives signals from the proximity and alignment sensors 252 that that a magnetic receiver of the coupler(s) 114 has engaged the object 104. The clasp control unit 116 then communicates with the couplers 114 to clasp the object. The clasp control unit 116 communicates with the transit vehicle controller 103 that the clasp assembly 108 has clasped the object 104.

Figure 2:
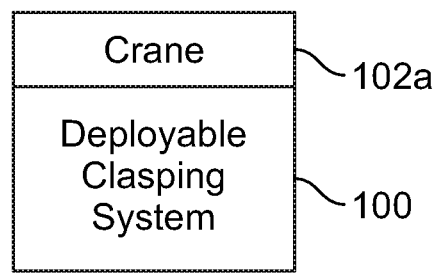
FIG. 2 illustrates a schematic block diagram of the deployable clasping system of a crane, according to an embodiment of the present disclosure.

FIG. 2 illustrates a schematic block diagram of the deployable clasping system 100 of a crane 102a, according to an embodiment of the present disclosure. That is, the crane 102a includes the deployable clasping system 100. The crane 102a is an example of the transit vehicle 102, shown in FIG. 1. The deployable clasping system 100 may be secured to a boom of the crane 102a, for example.

Figure 3:
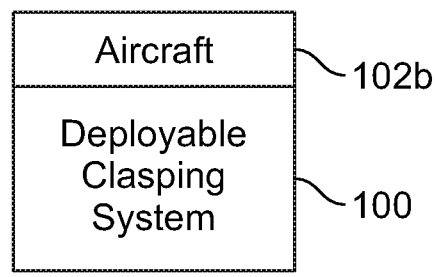
FIG. 3 illustrates a schematic block diagram of the deployable clasping system of an aircraft, according to an embodiment of the present disclosure.

FIG. 3 illustrates a schematic block diagram of the deployable clasping system 100 of an aircraft 102b, according to an embodiment of the present disclosure. That is, the aircraft 102b includes the deployable clasping system 100. The aircraft 102b is an example of the transit vehicle 102, shown in FIG. 1. The aircraft 102b may be a manned aircraft, such as a helicopter or airplane, or an unmanned aircraft, such as a UAV. The deployable clasping system 100 may be secured to a portion of the aircraft 102b.

Figure 4:
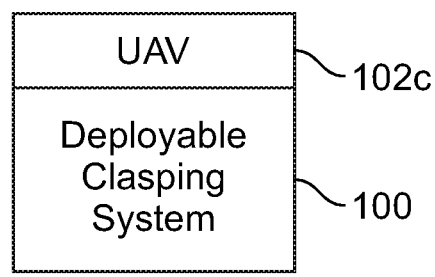
FIG. 4 illustrates a schematic block diagram of the deployable clasping system of an unmanned aerial vehicle (UAV), according to an embodiment of the present disclosure.

FIG. 4 illustrates a schematic block diagram of the deployable clasping system 100 of a UAV 102c, according to an embodiment of the present disclosure. The UAV 102c is an example of the aircraft 102b, shown in FIG. 2.

Referring again to FIG. 1, as used herein, the term "control unit," "controller," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the clasp control unit 116 and the guidance control unit 120 may be or include one or more processors that are configured to control operation thereof, as described herein.

The clasp control unit 116 and the guidance control unit 120 are configured to execute a set of instructions that are stored in one or more data storage units or elements (such as one or more memories), in order to process data. For example, the clasp control unit 116 and the guidance control unit 120 may include or be coupled to one or more memories. The data storage units may also store data or other information as desired or needed. The data storage units may be in the form of an information source or a physical memory element within a processing machine.

The set of instructions may include various commands that instruct the clasp control unit 116 and the guidance control unit 120 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the clasp control unit 116 and the guidance control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the clasp control unit 116 and the guidance control unit 120 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
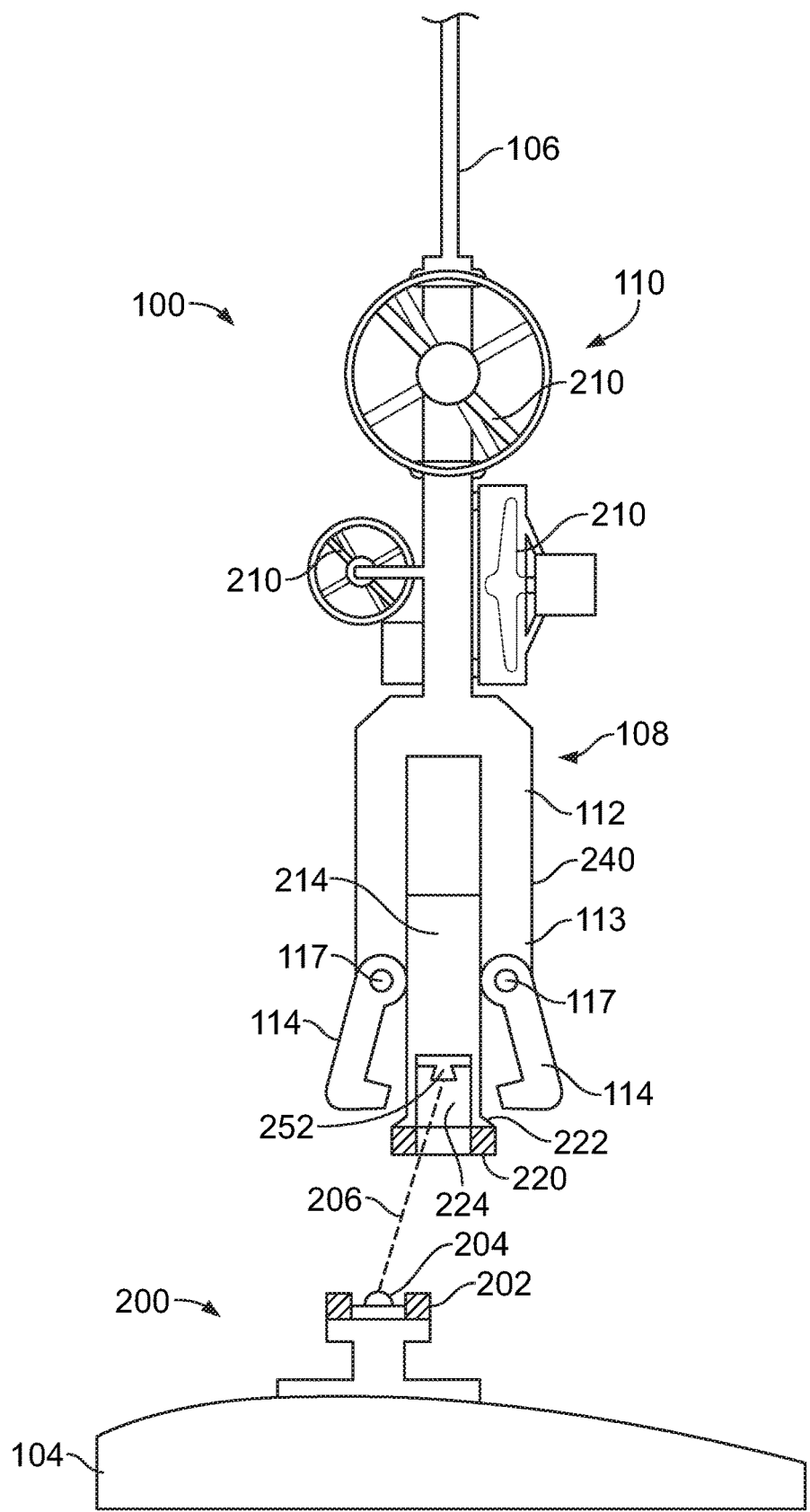
FIG. 5 illustrates a front view of the deployable clasping system positioned over an object, according to an embodiment of the present disclosure.

FIG. 5 illustrates a front view of the deployable clasping system 100 positioned over an object 104, according to an embodiment of the present disclosure. In at least one embodiment, the object 104 is a container, package, box, cargo, and/or the like. As another example, the object 104 may be an individual wearing a vest, jacket, harness, buckle, or the like having a target structure 200, such as a ring. In at least one embodiment, the target structure 200 is an attachment unit secured to the object 104. For example, the target structure 200 may be secured to a container, package, box, cargo, and/or the like. The target structure 200 includes a magnetic receiver 202, such as a ferromagnetic structure, such as a sheet, panel, or other such body. A guidance signal emitter 204 may be secured to the target structure 200 and configured to emit a guidance signal 206. For example, the guidance signal emitter 204 may be configured to emit the guidance signal 206 as a laser, an infrared beam, an ultrasonic signal, or the like. In at least one embodiment, the guidance signal emitter 204 may optionally or additionally be or include a guidance signal reflector.

In at least one embodiment, the propulsion sub-system 110 includes a plurality of propellers 210 (for example, fans) that are configured to be operated to move the deployable clasping system 100 in various directions. In at least one embodiment, the propellers 210 may be fixed in position. The plurality of propellers 210 fixed in different directions provide selective motion in the various different directions. In at least one other embodiment, the plurality of propellers 210 may be configured to rotate about different axes, such as via gimbals, to provide motion in different directions. In at least one embodiment, the propulsion sub-system 110 includes a single propeller 210 that is configured to rotate about different axes. Alternatively, the deployable clasping system 100 may not include the propulsion sub-system 110.

The clasp assembly 108 includes the clasp chassis 112 having opposed couplers 114, such as pivotal hooks, moveably mounted to a distal end 113 of the clasp chassis 112. The opposed couplers 114 are configured to open away from each other and close towards each other via pivot axles 117. In this manner, the couplers 114 are configured to open away from each other to secure over and around the target structure 200 (such as an attachment unit), and securely close onto and grasp the target structure 200. In at least one embodiment, the latches may be coupled to the clasp chassis 112 via one or more hinges and either a solenoid or a helical spring.

In at least one embodiment, the guidance device 115 includes one or more sensors 252 mounted to a clasp core 214 extending from the clasp chassis 112 between the couplers 114. A magnetic hitch 220 is positioned on a distal end 222 of the clasp core 214. The sensors 252 are secured within an open cavity 224 of the magnetic hitch 220.

Referring to FIGS. 1 and 5, in operation, the sensor(s) 252 receives the guidance signal 206 output by the guidance signal emitter 204. In at least one embodiment, the sensor(s) 252 (such as proximity and alignment sensors) emit the guidance signal 206, which reflects off a portion of the target structure 200 (instead of the target structure 200 including a separate guidance signal emitter 204). In at least one embodiment, the sensor(s) 252 may detect a portion of the target structure 200 through image recognition, such as a discernable identifying feature of the target structure 200.

The signal emitters 232 may output a guidance signal, which is reflected by the guidance reflector 204 on the target structure, and received by sensor(s) 252, which in turn transmit signals to the guidance control unit 120 (which may be part of the clasp control unit 116). The guidance control unit 120 then processes the signals to create control commands that cause the clasp assembly 108 to maneuver toward the target structure 200. These commands are transmitted to the propulsion sub-system 110 and winch 105, which operate according to these commands to maneuver the clasp assembly 108 toward the target structure 200. The clasp control unit 116 then operates the propulsion sub-system 110 (for example, the propeller(s) 210) and/or the winch 105 to maneuver the clasp assembly 108 towards and onto the target structure 200.

Alternatively, in an embodiment, the emitter guidance signal emitter 204 on the target structure 200 can produce signals that are received by the guidance control unit 120. The guidance control unit 120 then processes the signals to create control commands that cause the clasp assembly 108 to maneuver toward the target structure. These commands are transmitted to the propulsion sub system 110 and winch 105, which operate according to these commands to maneuver the clasp assembly 108 toward the target structure 200.

Alternatively, in an embodiment, the sensors 252 can operate without sending signals, by using image capture technology to discern a location of the target structure 200, and create control commands that cause the clasp assembly 108 to maneuver toward the target structure. These commands are transmitted to the propulsion sub system 110 and winch 105, which operate according to these commands to maneuver the clasp assembly 108 toward the target structure 200.

Figure 6:
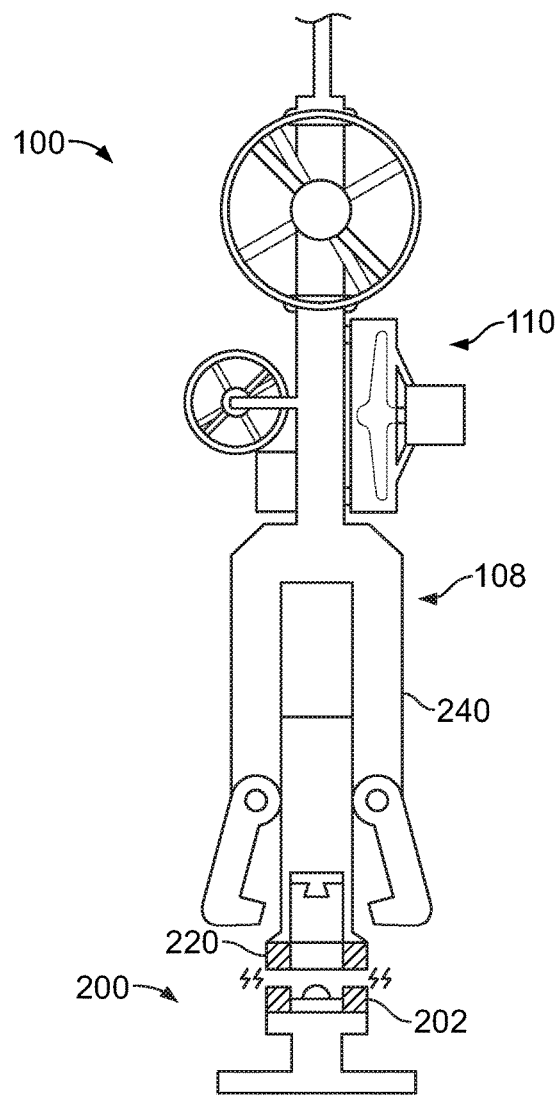
FIG. 6 illustrates a front view of the deployable clasping system aligned in relation to a target structure coupled to the object.

FIG. 6 illustrates a front view of the deployable clasping system 100 aligned in relation to the target structure 200 coupled to the object 104. Referring to FIGS. 1, 5, and 6, the clasp control unit 116 cooperates with the propulsion sub-system 110 is directed by the guidance control unit 120 (or uses the guidance control unit 120, as part of the clasp control unit 116) to maneuver the clasp assembly 108 into alignment with the target structure 200. When the magnetic hitch 220 is proximate to the magnetic receiver 202 of the target structure 200, the magnetic hitch 220 and the magnetic receiver 202 magnetically couple to one another, thereby providing a magnetic connection between the clasp assembly 108 and the target structure 200.

Figure 7:
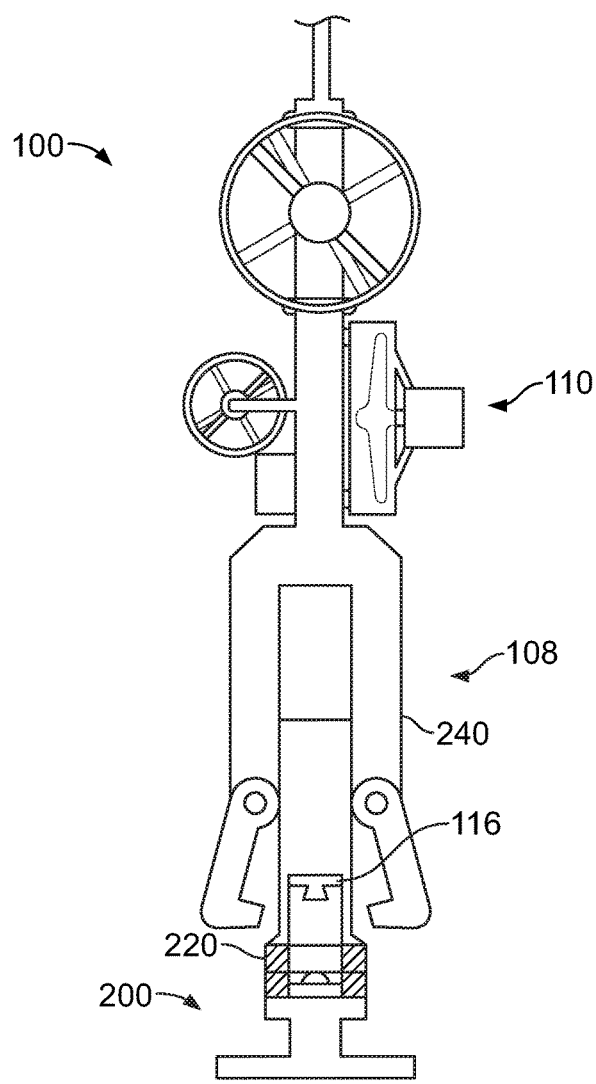
FIG. 7 illustrates a front view of the deployable clasping system magnetically coupled to the target structure coupled to the object.

FIG. 7 illustrates a front view of the deployable clasping system 100 magnetically coupled to the target structure 200 coupled to the object 104. Referring to FIGS. 1 and 7, in response to the magnetic hitch 220 magnetically coupling to the magnetic receiver 202, the guidance device 115 may output a magnetic coupling signal (such as via the sensors 252) to the guidance control unit 120. In response, the guidance control unit 120 may then operate the clasp assembly 108 to securely clasp the target structure 200 of the object 104.

Figure 8:
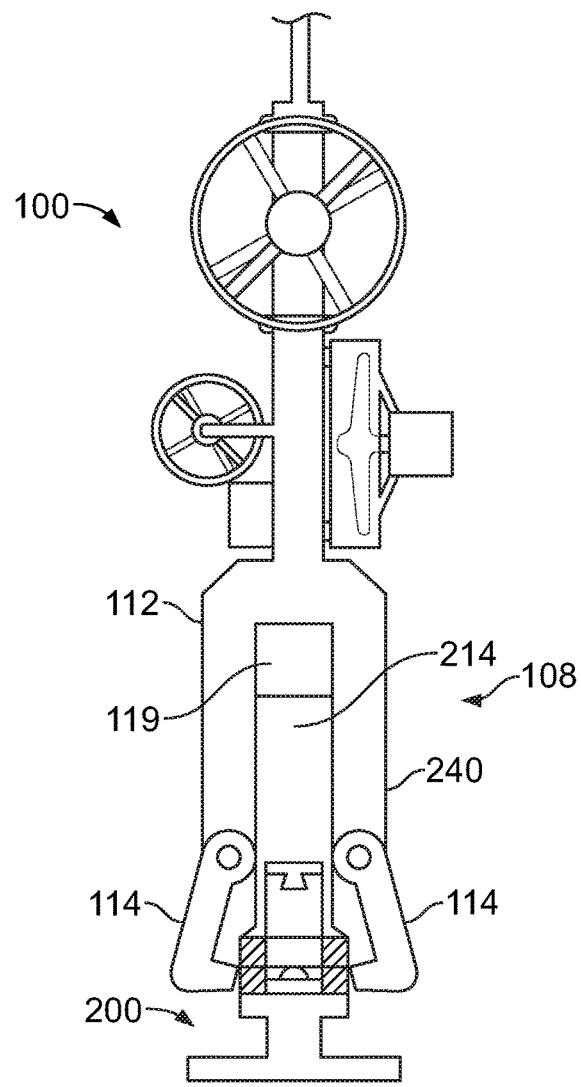
FIG. 8 illustrates a front view of the deployable clasping system moving onto the target structure coupled to the object.

FIG. 8 illustrates a front view of the deployable clasping system 100 moving onto the target structure 200 coupled to the object 104. In at least one embodiment, the clasp assembly 108 includes a lock ring 240 around a portion of the clasp chassis 112. For example, the lock ring 240 is configured to slide along the clasp chassis 112. The lock ring 240 may be servo controlled, so that the clasp core 214 may be retracted into a central channel 119 of the clasp chassis 112. Referring to FIGS. 1 and 8, after the guidance control unit 120 receives the magnetic coupling signal, the clasp control unit 116 operates the clasp assembly 108 to retract the clasp core 214 into the central channel 119 so that the couplers 114 slide over lateral portions of the target structure 200.

Figure 9:
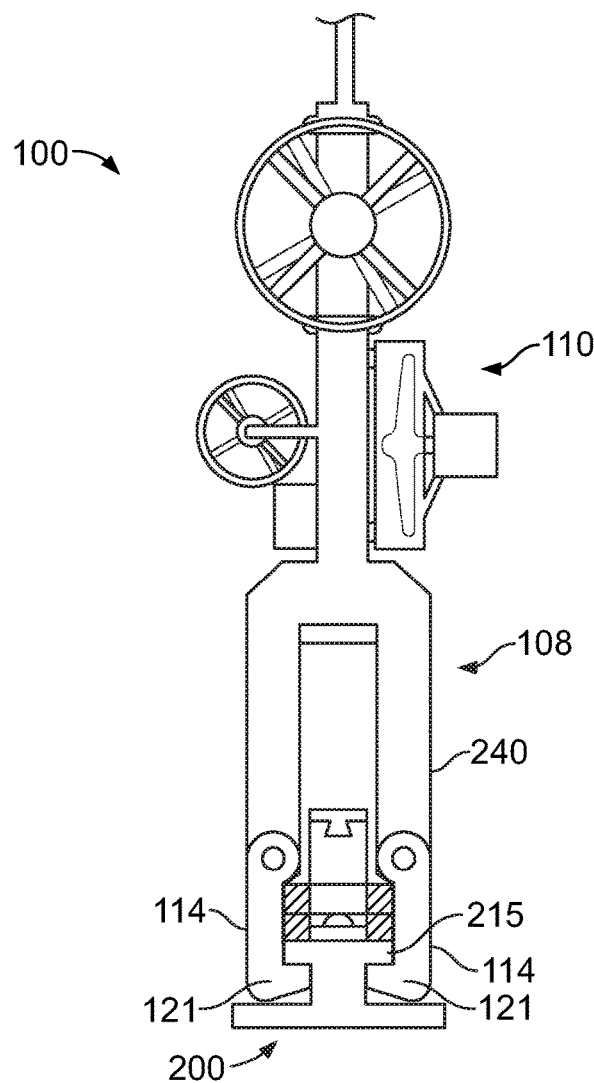
FIG. 9 illustrates a front view of the deployable clasping system securely clasping the target structure coupled to the object.

FIG. 9 illustrates a front view of the deployable clasping system 100 securely clasping the target structure 200 coupled to the object 104. Referring to FIGS. 1, 8, and 9, the clasp control unit 116 continues to operate the couplers 114 so that the distal hooks 121 of the couplers 114 pivotally latch underneath ledges 215 of the target structure 200 (and/or into channels of the target structure 200), thereby securely clasping onto the target structure 200. The clasp control unit 116 receives a grasping signal from the couplers 114 indicating a secure clasping, such as when the couplers 114 are in a defined clasping position, and/or via a signal received from an interface between the hooks 121 and the ledges 215 and/or channels of the target structure 200.

When the clasp assembly 108 is securely coupled to the target structure 200, as shown in FIG. 9, the deployable clasping system 100 may be used to lift and extract the object 104. For example, a crane, aircraft, or the like that includes the deployable clasping system 100 may then be operated to lift the object 104. In at least one embodiment, the couplers 114 securely clasp onto the target structure 200, as shown and described with respect to FIGS. 5-9. In at least one other embodiment, the couplers 114 may securely clasp onto other portions of the object 104, such as integral features of the object. In at least one other embodiment, the couplers 114 may securely clasp onto the object 104 by scooping up the object, or otherwise trapping one or more portions of the object between the couplers 114. In at least one other embodiment, the couplers 114 may securely clasp onto the object 104 by hooking onto a loop of tether, rope, net, or the like affixed to the object 104.

Figure 10:
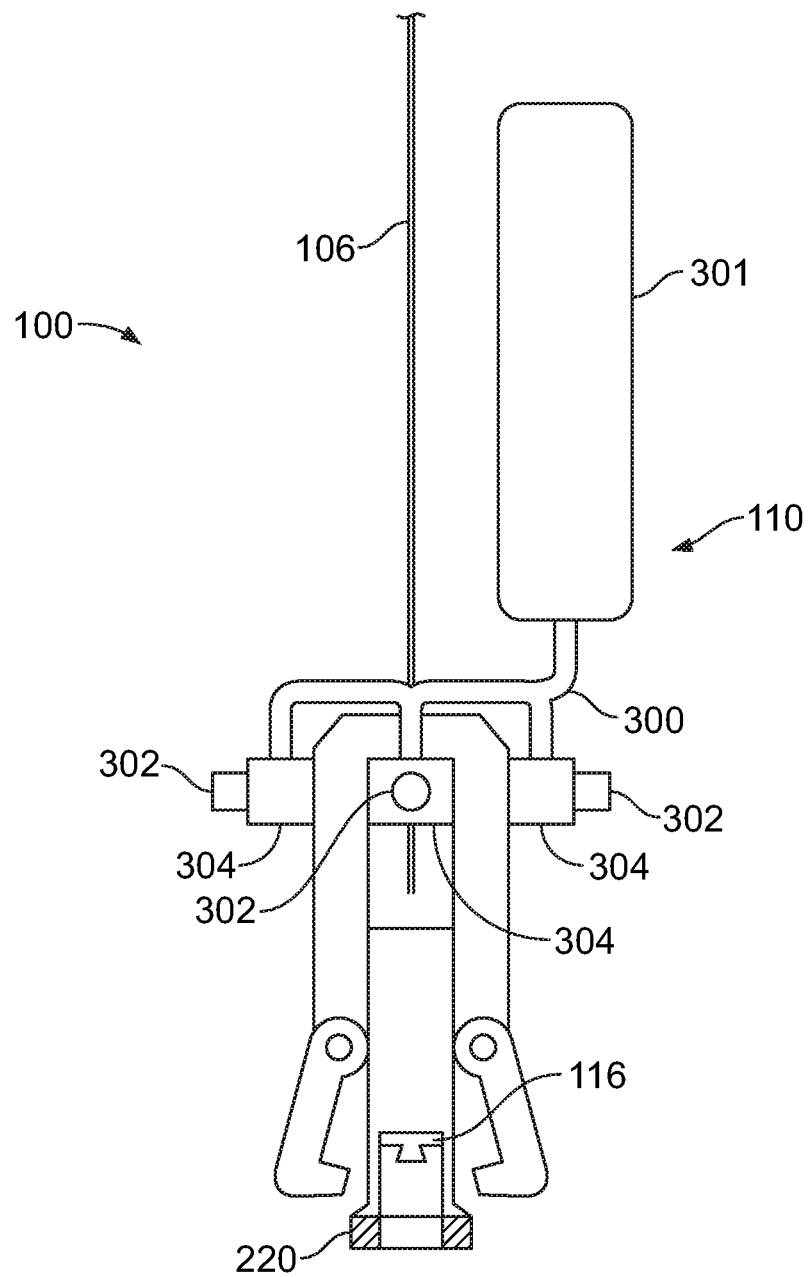
FIG. 10 illustrates a front view of the deployable clasping system, according to an embodiment of the present disclosure.

FIG. 10 illustrates a front view of the deployable clasping system 100, according to an embodiment of the present disclosure. In this embodiment, instead of the propulsion sub-system 110 including propellers, the propulsion sub-system 110 includes a vessel 301 containing compressed gas (such as air). The vessel 301 is in fluid communication with a manifold 300 having nozzles 302 coupled to valves 304. Referring to FIGS. 1 and 10, the clasp control unit 116 operates the propulsion sub-system 110 by selectively opening and closing the valves 304 to allow compressed gas to selectively pass out of the nozzles 302, thereby providing thrust in desired directions.

In at least one embodiment, the propulsion sub-system 110 includes the propeller(s) 210, as shown and described with respect to FIGS. 5-9, and the vessel 310, the manifold 300, the nozzles 302, and the valves 304 shown and described with respect to FIG. 10. In at least one other embodiment, the propulsion sub-system 110 includes a vessel of compressed gas, pressurized liquid, or rocket thrusters. Alternatively, the deployable clasping system 100 may not include the propulsion sub-system 110.

Figure 11:
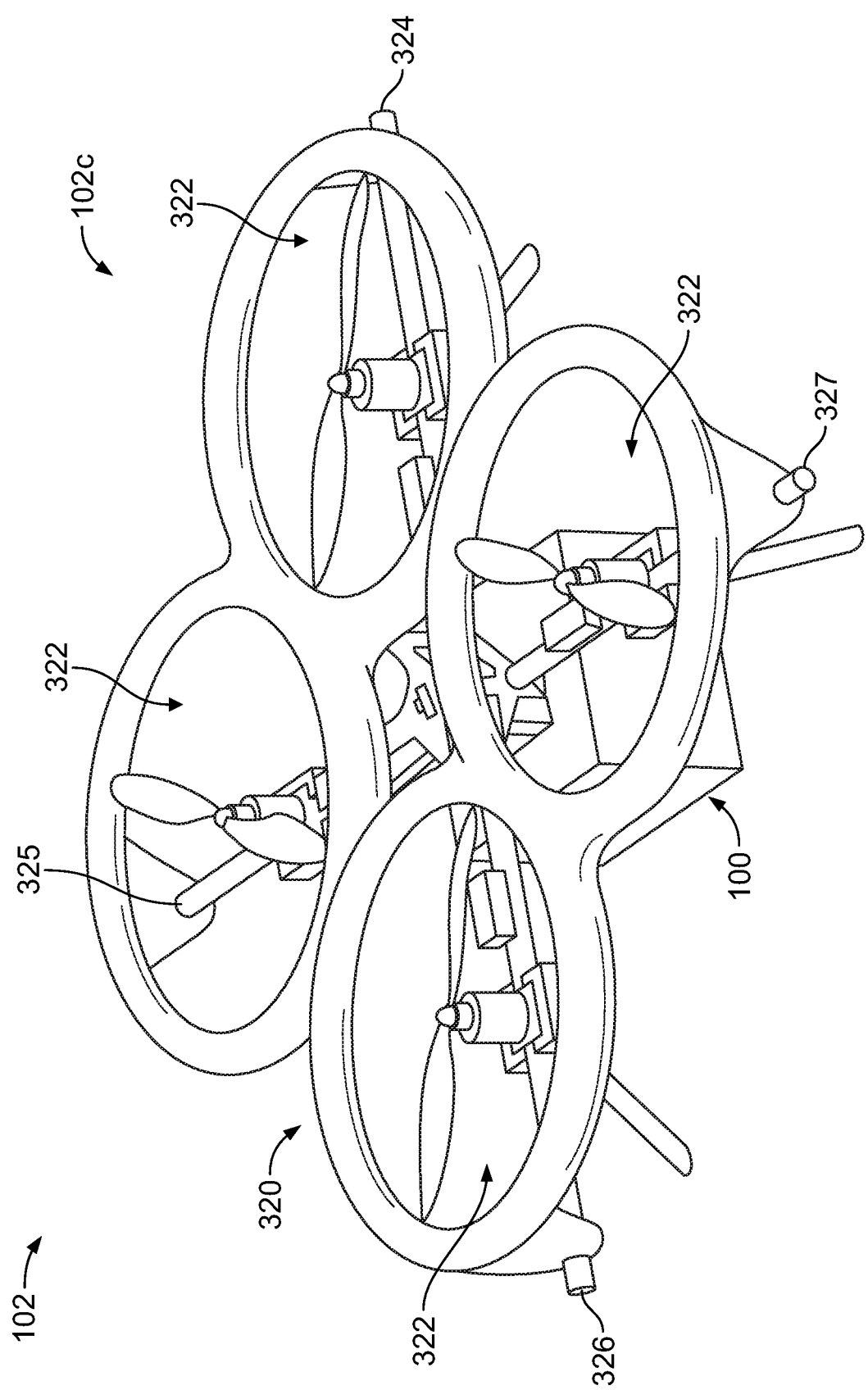
FIG. 11 illustrates a top view of a UAV, according to an exemplary embodiment of the present disclosure.

FIG. 11 illustrates a top view of a UAV 102c, according to an exemplary embodiment of the present disclosure. The UAV 102c is an example of the UAV 102c shown in FIG. 4, and is an example of a transit vehicle that includes the deployable clasping system 100, shown in FIGS. 1 and 5-10, for example. The UAV 102c includes an airframe 320 and a plurality of propelling systems 322 (which are separate and distinct from the propulsion sub-system 110 of the deployable clasping system 100) coupled to the airframe 320. In general, the airframe 320 forms the structural body or framework for the UAV 102c. In the illustrated embodiment shown in FIG. 11, the UAV 102c includes four propelling systems 322, such that each propulsion sub-system 322 is mounted to a respective arm 324, 325, 326, and 327. In the illustrated embodiment, the UAV 102c includes four arms 324-327 and a single propulsion sub-system 322 that is mounted to each respective arm 324-327. Optionally, the UAV 102c may include more or less propelling system 322, more or less propelling systems 322 per arm 324-327, and more or less arms 324-327 than shown.

Referring to FIGS. 1 and 4-11, the deployable clasping system 100 is secured to a portion of the airframe 320. For example, the deployable clasping system 100 is secured to a central portion of the airframe 320. A vehicle may include the deployable clasping system 100. The winch 105 and the propulsion sub-system 110 are operated to guide the clasp assembly 108 to the target structure 200 of the object 104, for example.

The UAV 102c shown in FIG. 11 is merely one example of a UAV. The UAV 102c may optionally be a fixed wing plane with various other types of propulsion sub-systems. For example, the UAV 102c may be an unmanned plane having one or more propellers, jet engines, and/or the like.

Figure 12:
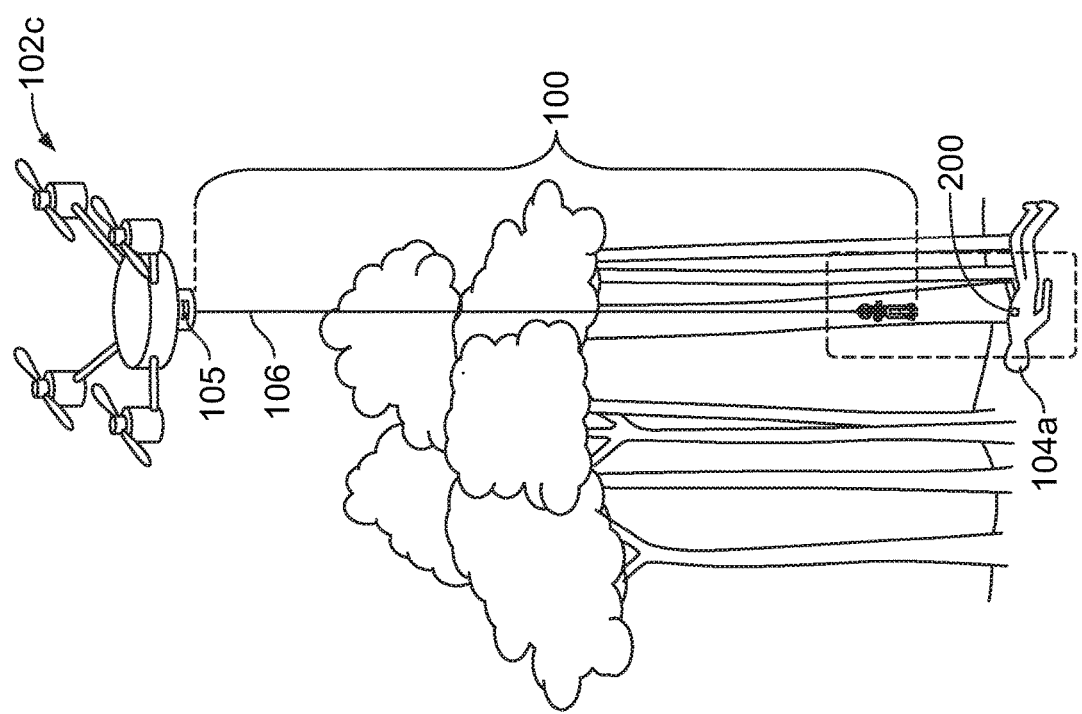
FIG. 12 illustrates a front view of a UAV having the deployable clasping system being maneuvered towards an individual, according to an embodiment of the present disclosure.

FIG. 12 illustrates a front view of a UAV 102c having the deployable clasping system 100 being maneuvered toward an individual 104a, according to an embodiment of the present disclosure. The UAV may be maneuvered to the location of the individual, such as via global positioning system (GPS) signals output by a GPS device carried by the individual 104a. In at least one embodiment, the deployable clasping system 100 includes a control unit (for example, the clasp control unit 116, the guidance control unit 120, and/or another control unit) that is configured to detect a range to individual 104a (or another object) to determine a distance to travel before the clasp assembly 108 is able to couple to the individual 104a, such as via a target structure 200. The deployable clasping system 100 may be deployed from the UAV 102c, and securely clasp onto a portion of the individual 104a, such as the target structure 200 of a harness worn by the individual 104a, as described herein.

Figure 13:
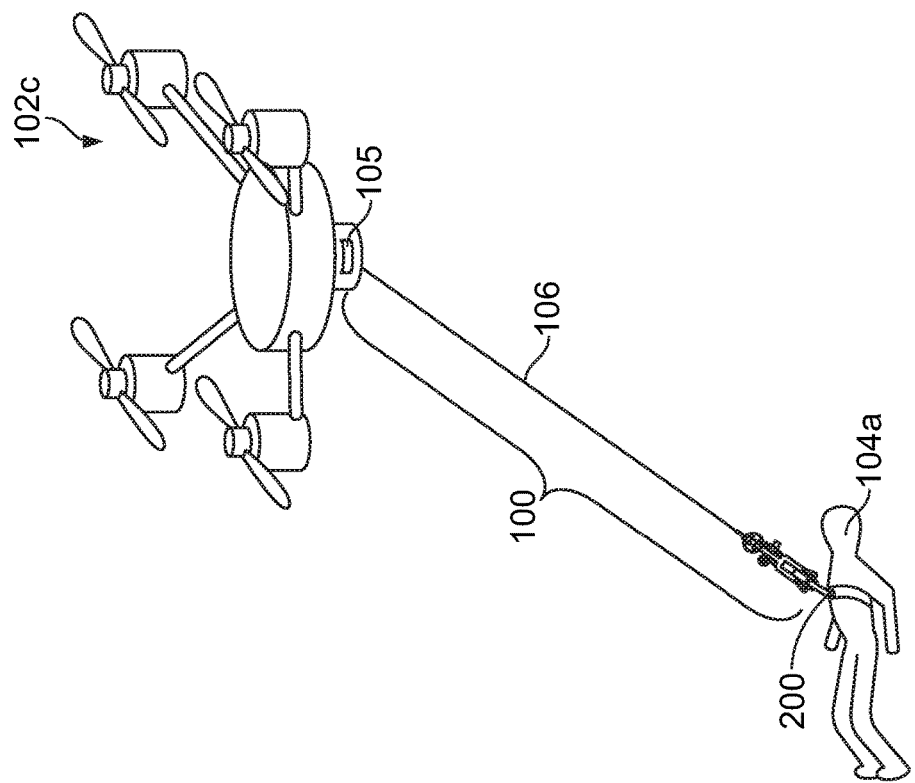
FIG. 13 illustrates a front view of the UAV moving the individual to another location, according to an embodiment of the present disclosure.

FIG. 13 illustrates a front view of the UAV 102c moving the individual 104a to another location, according to an embodiment of the present disclosure. Once the individual 104a is secured to the deployable clasping system 100, the UAV may then fly the individual 104a to a safe location.

Figure 14:
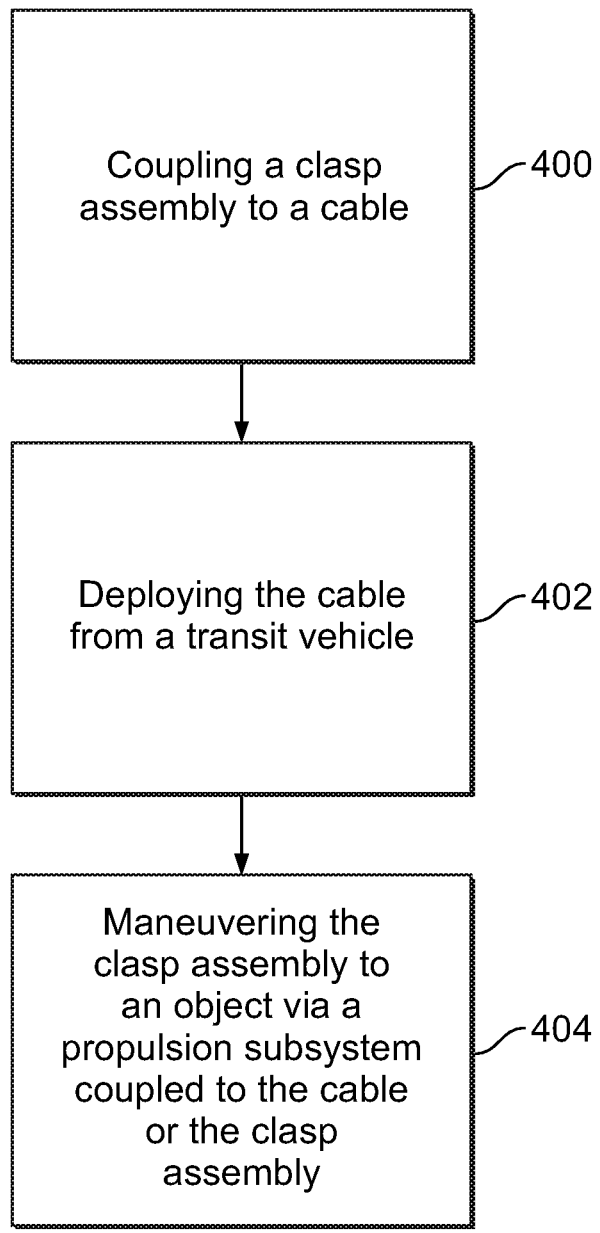
FIG. 14 illustrates a flow chart of a deployable clasping method that is configured to securely clasp and release an object, according to an embodiment of the present disclosure.

FIG. 14 illustrates a flow chart of a deployable clasping method that is configured to securely clasp and release an object, according to an embodiment of the present disclosure. In at least one embodiment, the transit vehicle controller 103 (shown in FIG. 1) of the transit vehicle 102 controls movement of the transit vehicle 102 into the vicinity of the object. Next, the transit vehicle controller(s) 103 operates the winch 105 (shown in FIG. 1) vertically, and the propulsion sub-system 110 horizontally maneuvers the clasp assembly 108 into contact with the object, such as with respect to the target structure 200 (shown in FIGS. 1 and 5, for example) on the object. The deployable clasping method may include coupling (400) a clasp assembly that is configured to securely clasp the object to a cable, deploying (402) the cable from a transit vehicle (such as via a winch or another deployment device), and maneuvering (404) the clasp assembly to the object by a propulsion sub-system that is coupled to one or both of the cable or the clasp assembly. The method may also include coupling the clasp assembly to the object via operation of the couplers, such as latches.

The coupling the clasp assembly may include operatively coupling one or more couplers to a clasp chassis. The maneuvering (404) may include maneuvering the clasp assembly to the object by one or more propellers.

The deployable clasping method may also include guiding movement of the clasp assembly to the object by a guidance device. The deployable clasping method may also include magnetically coupling the clasp assembly to a target structure coupled to the object. The deployable clasping method may also include securely latching onto the target structure after the magnetic coupling. In at least one embodiment, the deployable clasping method includes controlling the clasp assembly and the propulsion sub-system by a clasp control unit.

Referring to FIGS. 1-14, embodiments of the present disclosure provide efficient, reliable, and automatically-operated grasping systems and methods. Further, embodiments of the present disclosure provide grasping systems and methods that allow an object to be safely recovered.

As described herein, the deployable clasping systems and methods may be used in relation to extraction and recovery of individuals from hostile territory, insertion of tactical operators (such as special forces) into locations, transportation of military prisoners to secure holding facilities without manned escort, insertion and extraction of emergency personnel (such as forest fire combating personal), civilian search and recovery victim evacuations, crane operations, and/or the like.

The deployable clasping systems and methods may also be used to transport objects between different locations. For example, the deployable clasping systems and methods may be used to deliver cargo via an aircraft (such as a UAV) from a first location (such as a warehouse, distribution center, or the like) to a second location (such as a residence) that differs from the first location.

FIG. 15 illustrates a perspective top view of an attachment unit 500 secured to cargo 502, according to an embodiment of the present disclosure. The attachment unit 500 is an example of the target structure 200, shown in FIG. 1. The cargo 502 is an example of the object 104, shown in FIG. 1. The attachment unit 500 secured to the cargo 502 provides a transportable system 503.

The cargo 502 may be a container, package, box, or the like that contains one or more items, or an item itself. As an example, the cargo 502 is configured to be delivered by a transit vehicle 102 (shown in FIG. 1), such as a UAV, to a location. Referring to FIGS. 1 and 15, the transit vehicle 102 includes the clasp assembly 108 that is configured to removably coupled to the cargo 502 by way of the clasp assembly 108 removably securing to the attachment unit 500.

The cargo 502 includes one or more outer walls 504. The attachment unit 500 is secured to the one or more outer walls 504. For example, the cargo 502 includes perimeter walls 504a upwardly extending from a base 504b. The perimeter walls 504a, in turn, connect to an upper wall 504c defining a top surface 506. As shown, the attachment unit 500 is mounted on the top surface 506.

The cargo 502 may be sized and shaped differently than shown. For example, the cargo 502 may be cylindrical, pyramidical, irregularly shaped, or the like.

FIG. 16 illustrates a perspective top view of the attachment unit 500 of FIG. 15 secured to the top surface 506 of the cargo 502. The attachment unit 500 includes one or more portions that are configured to secure to the cargo 502 and one or both of mechanically or magnetically removably couple to a clasp assembly, such as the clasp assembly 108 of FIGS. 1 and 5-9. For example, the attachment unit 500 includes a main body 510 secured to the cargo 502. In at least one embodiment, an adhesive 512 secures the attachment unit 500 (such as the main body 510) to the top surface 506.

In at least one embodiment, the main body 510 includes a magnetic receiver 514, such as a ferromagnetic disc, sheet, panel, or other such body. The magnetic receiver 514 is configured to be magnetically or electromagnetically coupled to a magnetic or an electromagnetic portion of a clasp assembly, such as the magnetic hitch 220 shown in FIG. 5, for example.

As shown, the attachment unit 500 also includes a guidance member 516. The guidance member 516 may be located at a center 518 of a top surface 520 of the main body 510. In at least one embodiment, the guidance member 516 is an example, of the guidance signal emitter 204 (shown in FIG. 4), which may be configured to emit the guidance signal 206 as a laser, an infrared beam, an ultrasonic signal, or the like. In at least one embodiment, the guidance member 516 is a guidance signal reflector.

In operation, the clasp assembly 108 is configured to selectively clasp and release the cargo 502 via the attachment unit 500. For example, the clasp assembly 108 is configured to locate and be guided to the attachment unit 500 through the guidance member 516, as described above with respect to FIG. 5. The clasp assembly 108 is further configured to selectively clasp and release the cargo 502 via electromagnetic coupling between the magnetic hitch 220 and the magnetic receiver 514 of the attachment unit 500. In this manner, a UAV, for example, having the clasp assembly 108 can securely clasp the cargo 502, via the attachment unit 500, and deliver the cargo 502 to a location.

FIG. 17 illustrates a perspective top view of an attachment unit 500 secured to the top surface 506 of the cargo 502, according to an embodiment of the present disclosure. The attachment unit 500 secured to the cargo 502 provides the transportable system 503. The attachment unit 500 includes one or more portions that are configured to secure to the cargo 502 and one or both of mechanically or magnetically removably couple to a clasp assembly, such as the clasp assembly 108 of FIGS. 1 and 5-9. For example, in this embodiment, the attachment unit 500 includes a base 530 that connects to a knob 532 through a neck 534. In at least one embodiment, the neck 534 is aligned with a longitudinal axis 535 of the attachment unit 500.

An undercut region 536 is formed between the base 530, the knob 532, and the neck 534. In particular, the undercut region 536 is defined between an upper surface 538 of the base 530, an outer shaft 540 of the neck 534, and a lower surface 542 of the knob 532.

In at least one embodiment, a guidance member 516 is coupled to the knob 532. For example, the guidance member 516 is recessed within a central divot 544 formed within the knob 532. Optionally, the guidance member 516 may upwardly and outwardly extend from a top surface 546 of the knob 532.

The attachment unit 500 is secured to the top surface 506 of the cargo 502 through an adhesive 548. For example, the adhesive 548 secures an underside 550 of the base 530 to the top surface 506 of the cargo 502.

In at least one embodiment, one or more portions of the base 530, the knob 532, and/or the neck 534 are formed of magnetic material or otherwise include a magnetic receiver. As such, the attachment unit 500 is configured to magnetically couple with a clasp assembly, such as to the magnetic hitch 220 of the clasp assembly 108 shown in FIG. 5. Optionally, the attachment unit 500 may not include a magnetic receiver. In at least one embodiment, the attachment unit 500 is integrally molded and formed as a single piece of plastic, such as injection molded plastic.

The undercut region 536 may extend around an entire circumference or perimeter of the attachment unit 500. As such, the undercut region 536 allows for a clasp assembly to securely clasp to the attachment unit 500 at any circumferential or radial position, regardless of a clocking angle.

Referring to FIGS. 5-9 and 17, the clasp assembly 108 locates the attachment unit 500 and mechanically (and optionally magnetically) secures thereto, as described with respect to FIGS. 5-9. For example, the couplers 114 of the clasp assembly 108 secure to the attachment unit 500 within the undercut region 536 (such as shown in FIG. 9).

Figure 18:
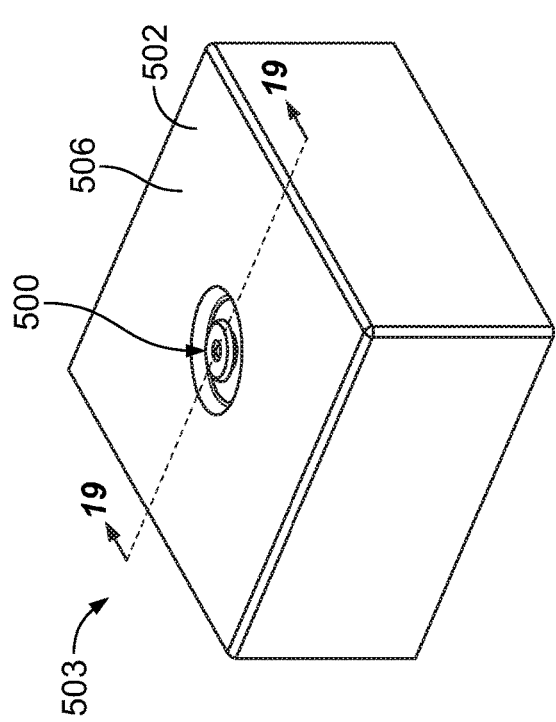
FIG. 18 illustrates a perspective top view of cargo having an attachment unit, according to an embodiment of the present disclosure.

FIG. 18 illustrates a perspective top view of cargo 502 having an attachment unit 500, according to an embodiment of the present disclosure. The attachment unit 500 includes one or more portions that are configured to secure to the cargo 502 and one or both of mechanically or magnetically removably couple to a clasp assembly, such as the clasp assembly 108 of FIGS. 1 and 5-9. For example, in this embodiment, the attachment unit 500 is integrally formed with the cargo 502, instead of being separately affixed to the cargo 502, thereby providing the transportable system 503. For example, the attachment unit 500 is an integral part of the top surface 506 of the cargo 502.

Figure 19:
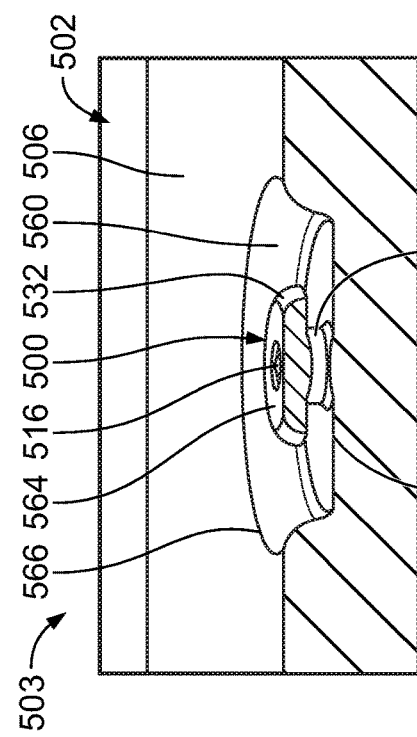
FIG. 19 illustrates a cross-sectional view of the cargo of FIG. 18 through line 19-19.

FIG. 19 illustrates a cross-sectional view of the cargo 502 of FIG. 18 through line 19-19. The attachment unit 500 is disposed within a recess 560 of the top surface 506. The attachment unit 500 is similar to the attachment unit 500 shown in FIG. 17, except that an outer surface 562 of the cargo 502 forms the base of the attachment unit 500. The knob 532 of the attachment unit 500 upwardly extends from the outer surface 562 via the neck 534.

In at least one embodiment, an upper surface 564 of the attachment unit 500 (such as that of the knob 532) is within or optionally below a plane in which an outermost upper surface 566 of the top surface 506 resides. As such, the attachment unit 500 may not outwardly extend past the outermost upper surface 566 of the cargo 502. Accordingly, the cargo 502 may be safely and securely secured underneath additional cargo 502, without adversely affecting the attachment unit 500, and without the attachment unit 500 propping up a portion of the cargo 502 above.

Figure 20:
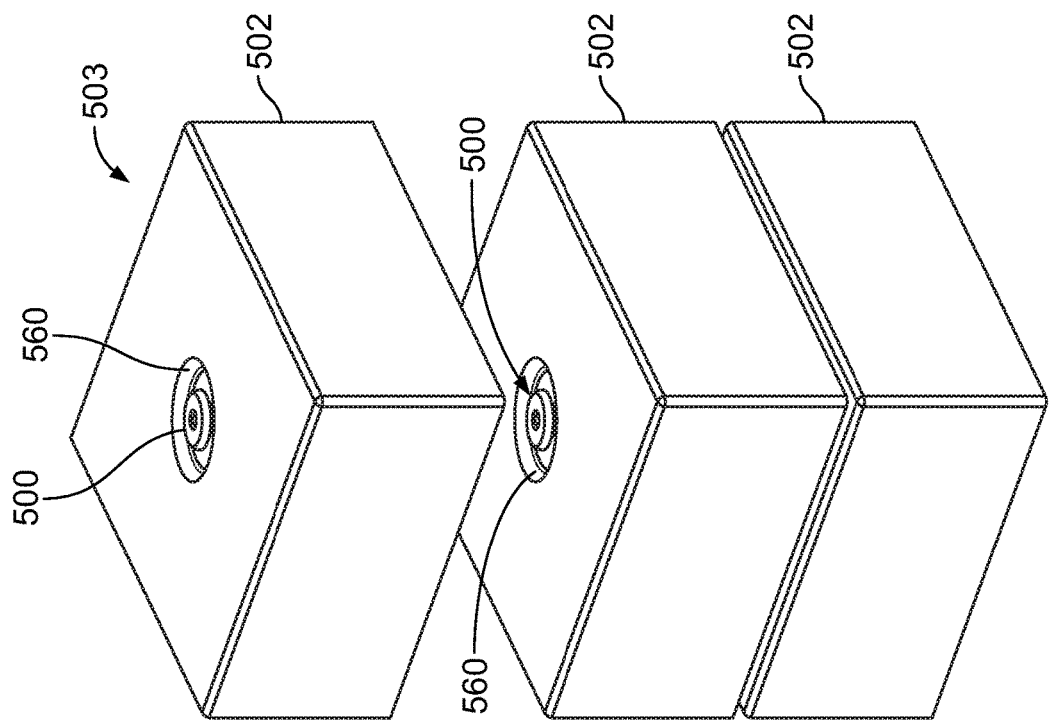
FIG. 20 illustrates a perspective lateral view of a plurality of cargo stacked upon one another, according to an embodiment of the present disclosure.

FIG. 20 illustrates a perspective lateral view of a plurality of cargo 502 stacked upon one another, according to an embodiment of the present disclosure. The cargo 502 include the attachment units 500. That is, the attachment units 500 are integrally formed with the cargo 502. The attachment units 500 are within recesses 560, thereby allowing the cargo to be safely and secured stacked.

Figure 21:
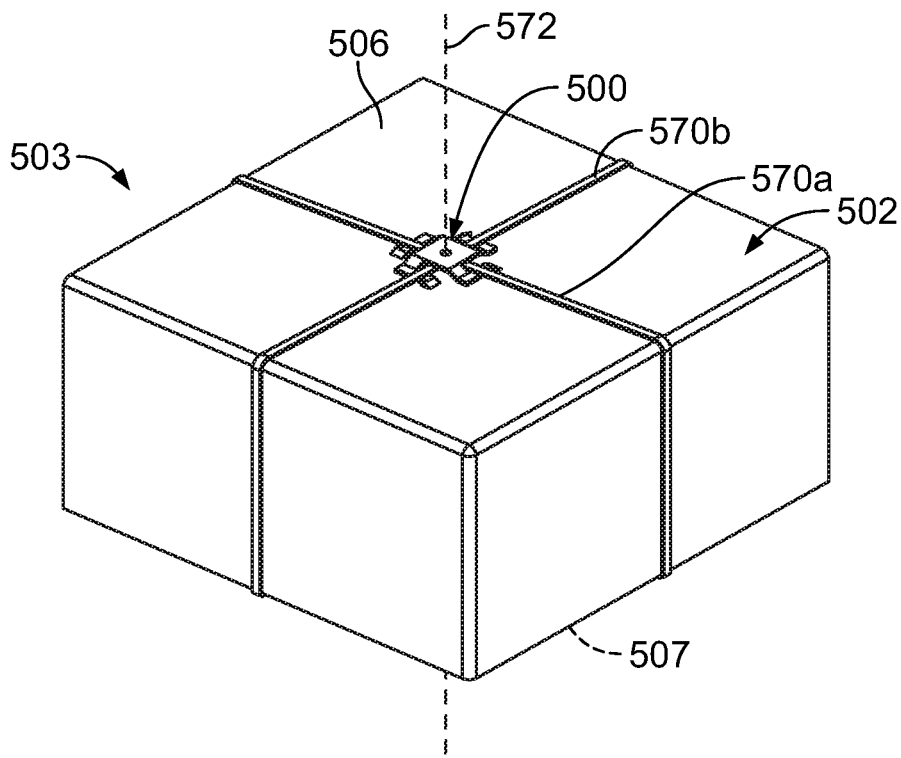
FIG. 21 illustrates a perspective top view of an attachment unit secured to cargo, according to an embodiment of the present disclosure.

FIG. 21 illustrates a perspective top view of an attachment unit 500 secured to cargo 502, according to an embodiment of the present disclosure. The attachment unit 500 secured to the cargo 502 provides the transportable system 503. The attachment unit 500 secures to the cargo 502 via one or more straps 570a and 570b. The straps 570a and 570b may be wires, ropes, ribbons, belts, cables, or the like. The straps 570a and 570b intersect one another on the top surface 506 (and optionally on a bottom surface 507) of the cargo 502. For example, the strap 570a overlaps (or underlaps) the strap 570b at a right angle proximate a central axis 572 on the top surface 506. The attachment unit 500 secures over the intersection of the straps 570a and 570b. In at least one embodiment, the attachment unit 500 secures to the cargo 502 through one or both of the straps 570a and 570b without the use of adhesive. Optionally, adhesive may also be used to secure the attachment unit 500 to the cargo 502.

Figure 22:
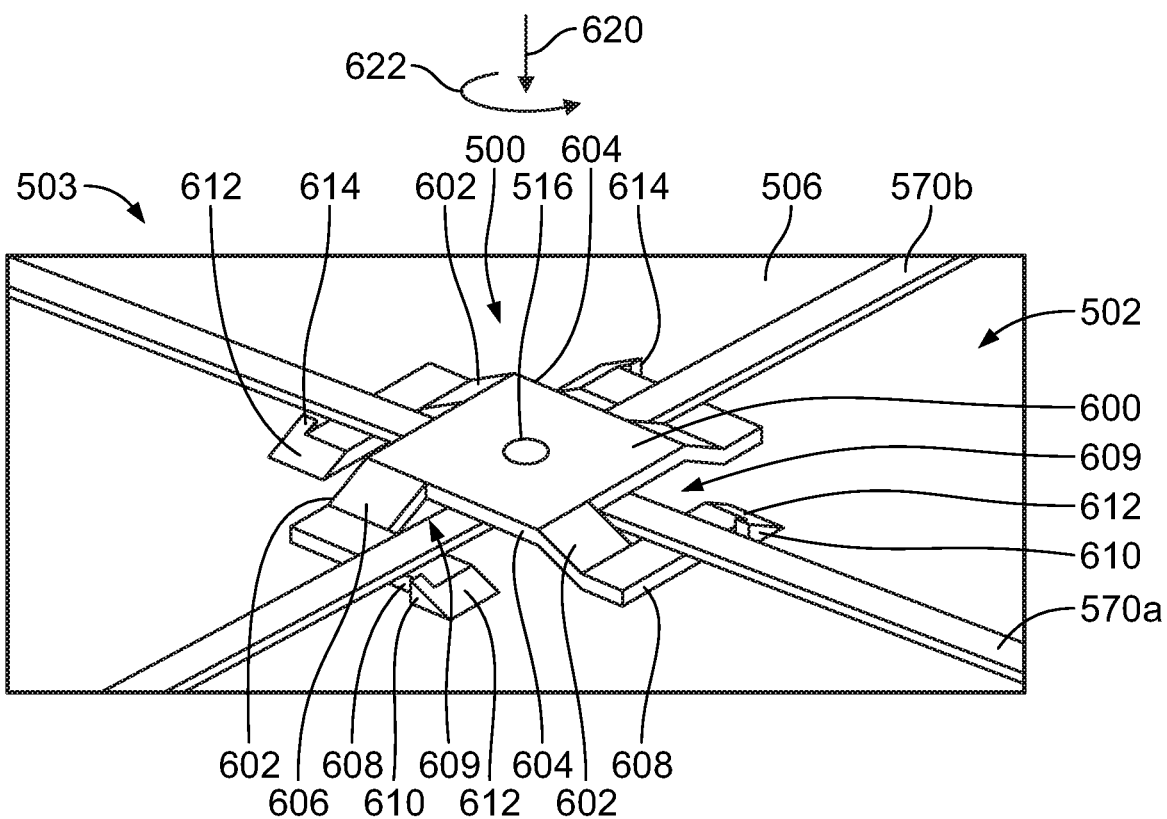
FIG. 22 illustrates a perspective top view of the attachment unit of FIG. 15 secured to a top surface of the cargo.

FIG. 22 illustrates a perspective top view of the attachment unit 500 of FIG. 15 secured to the top surface 506 of the cargo 502. The attachment unit 500 includes one or more portions that are configured to secure to the cargo 502 and be mechanically and/or magnetically removably coupled to and/or with a clasp assembly, such as the clasp assembly 108 of FIGS. 1 and 5-9. For example, as shown in FIG. 22, in at least one embodiment, the attachment unit 500 includes a platform 600, such as a flat panel. A plurality of flanges 602 outwardly extend from an outer perimeter or peripheral edge 604 of the platform 600. The flanges 602 includes an angled arm 606 connected to support beam 608. The angled arm 606 downwardly disposes the support beam 608 from the platform 600 so that the flanges 602 upwardly prop the platform 600 from the top surface 506 of the cargo 502, thereby providing strap slots 609 defined between the angled arm 606 and the support beam 608. The support beam 608 may be perpendicular in relation to the angled arm 606.

Distal ends 610 of the support beams 608 includes a ramped surface 612. A retaining barb 614 upwardly extends from the ramped surface 612.

As shown, the attachment unit 500 may include four flanges 602 outwardly and downwardly extending from the platform 600. In order to secure the attachment unit 500 to the cargo 502, the attachment unit 500 is aligned over the intersection of the straps 570a and 570b on the top surface 506 of the cargo 502. The attachment unit 500 is then urged onto the intersection of the straps 570a and 570b (underneath the platform 600) in the direction of arrow 620. Once on and over the straps 570a and 570b, the attachment unit 500 is twisted or otherwise rotated in the direction of arc 622, so that the portions of the straps 570a and 570b slide into the strap slots 609 and over the ramped surfaces 612 onto the support beams 608. After portions of the straps 570a and 570b are slid over the ramped surfaces 612, the retaining barbs 614 ensure that the attachment unit 500 is securely retained to the straps 570a and 570b and the cargo 502, thereby locking the portions of the straps 570a and 570b in respective strap slots 609. For example, if the attachment unit 500 tends to twist in a direction opposite from arc 622, the retaining barbs 614 stop further progression such direction.

As shown, the attachment unit 500 may include a guidance member 516, as described above. The attachment unit 500 may be formed of or otherwise include magnetic material and/or a magnetic receiver, as described above. Optionally, the attachment unit 500 may not include magnetic material. A clasp assembly, such as the clasp assembly 108 shown in FIGS. 1 and 5-9, is configured to mechanically and/or magnetically connect to the platform 600, as described above.

Figure 23:
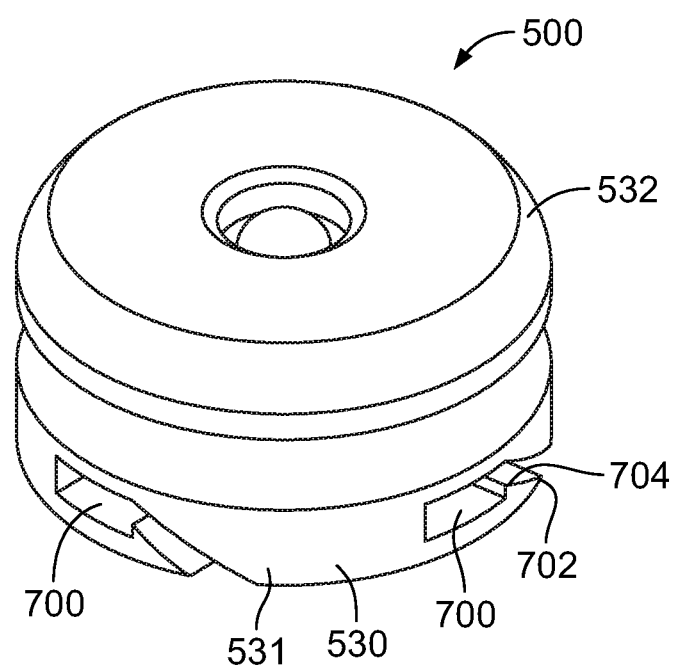
FIG. 23 illustrates a perspective view of an attachment unit, according to an embodiment of the present disclosure.

FIG. 23 illustrates a perspective view of an attachment unit 500, according to an embodiment of the present disclosure. The attachment unit 500 includes one or more portions that are configured to secure to the cargo 502 and one or both of mechanically or magnetically removably couple to a clasp assembly, such as the clasp assembly 108 of FIGS. 1 and 5-9. For example, the attachment unit 500 is similar to the attachment unit shown in FIG. 17, except that a plurality of strap slots 700 are formed within the base 530. For example, the strap slots 700 are formed about a perimeter or peripheral edge 531 of the base 530. As shown in FIG. 23, the strap slots 700 are formed in the base 530, instead of extending outwardly from or below the base 530. Ramped surfaces 702 having retainer barbs 704 (such as interior blunt ridges or edges and/or upwardly extending protuberances) lead into the strap slots 700. As shown, four regularly-spaced strap slots 700 may be formed in the base 530. Each strap slot 700 is configured to receive and retain a portion of a strap.

Figure 24:
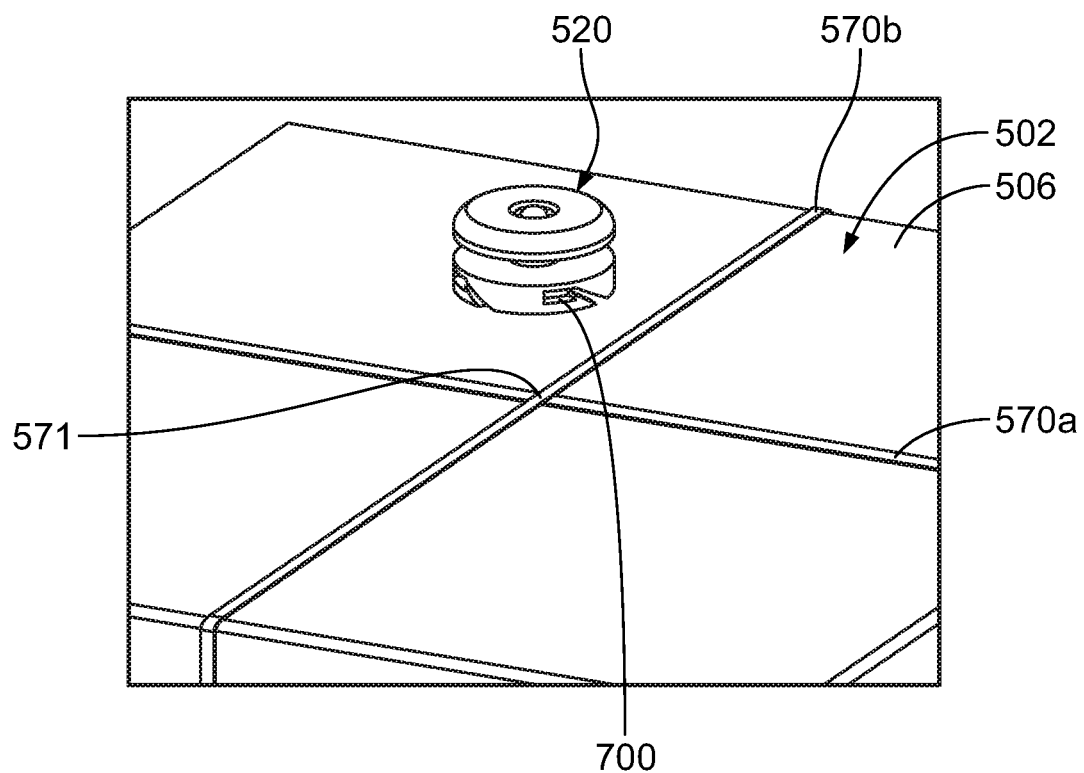
FIG. 24 illustrates a perspective view of the attachment unit of FIG. 23 aligned over an intersection of straps on a top surface of cargo, according to an embodiment of the present disclosure.

FIG. 24 illustrates a perspective view of the attachment unit 500 of FIG. 23 aligned over an intersection 571 of straps 570*a* and 570*b* on the top surface 506 of the cargo 502, according to an embodiment of the present disclosure. In order to secure the attachment unit 500 to the cargo 502 via the straps 570*a* and 570*b*, the attachment unit 500 may first be axially aligned with the intersection 571.

Figure 25:
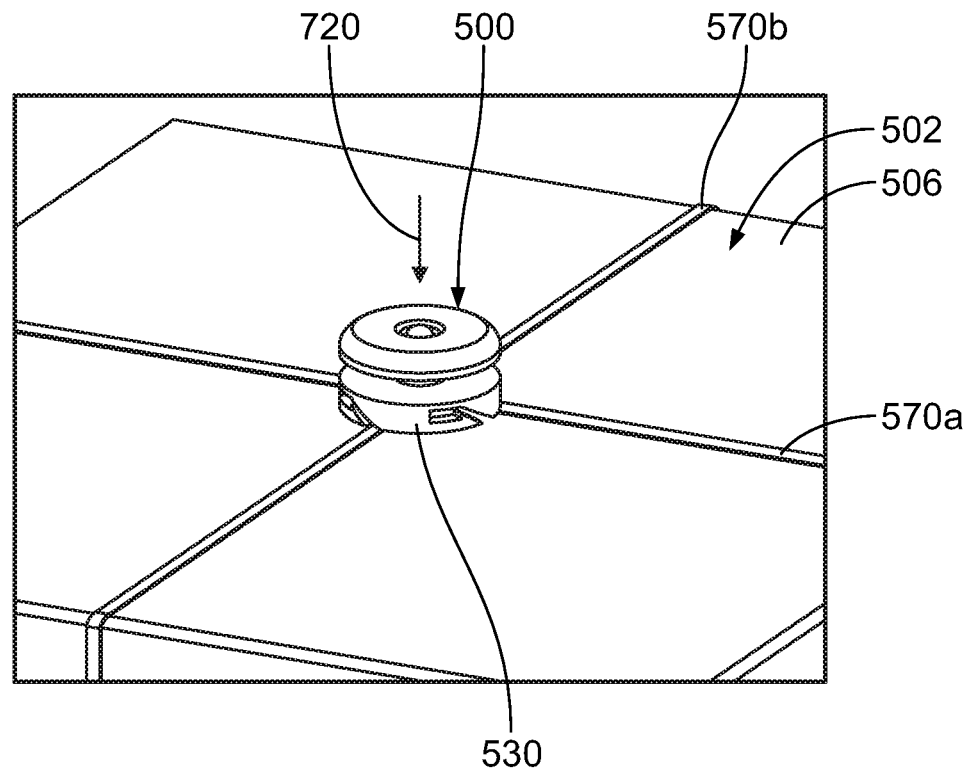
FIG. 25 illustrates a perspective view of the attachment unit of FIG. 23 disposed on portions of the straps on the top surface of the cargo.

FIG. 25 illustrates a perspective view of the attachment unit 500 of FIG. 23 disposed on portions of the straps 570*a* and 570*b* on the top surface 506 of the cargo 502. Referring to FIGS. 24 and 25, after the attachment unit 500 is axially aligned with the intersection 571, the attachment unit 500 is urged in the direction of arrow 720 onto the top surface 506 so that the base 530 touches the top surface 506 and portions of the straps 570*a* and 570*b*.

Figure 26:
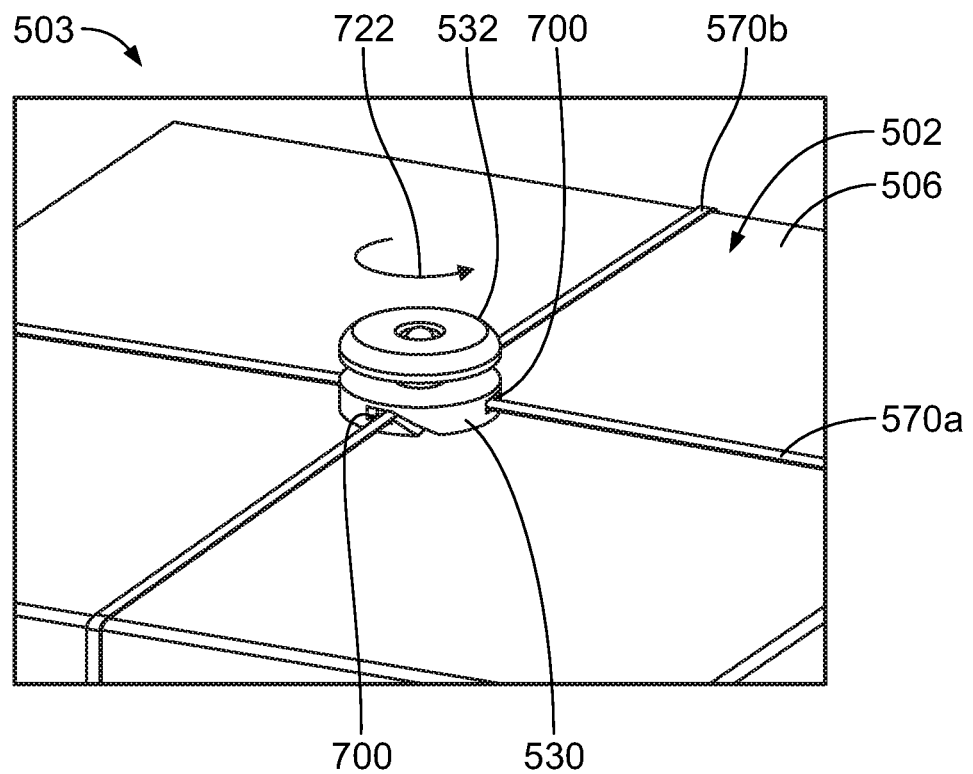
FIG. 26 illustrates a perspective view of the attachment unit of FIG. 23 secured to the cargo via the straps on the top surface of the cargo.

FIG. 26 illustrates a perspective view of the attachment unit 500 of FIG. 23 secured to the cargo 502 via the straps 570*a* and 570*b* on the top surface 506 of the cargo 502. Referring to FIGS. 23-26, after the attachment unit 500 is positioned on and over the intersection 571, the attachment unit 500 is twisted or otherwise rotated in the direction of arc 722, so that portions of the straps 570*a* and 570*b* slide into respective strap slots 700 over the ramped surfaces 702 and are securely retained therein by the retainer barbs 704, thereby providing the transportable system 503 In this manner, the attachment unit 500 may be securely coupled to the cargo 502 without the use of adhesives. Optionally, adhesive may also be used to secure the attachment unit 500 to the cargo 502.

Figure 27:
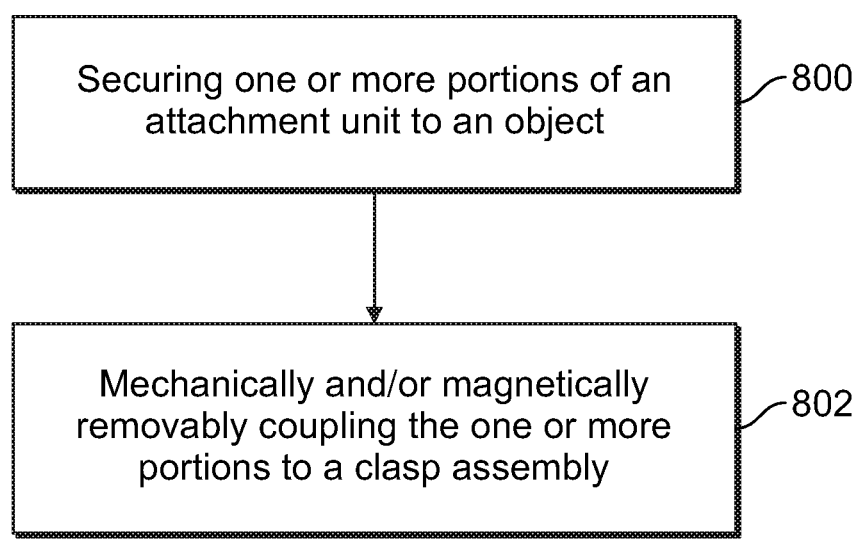
FIG. 27 illustrates a flow chart of a method of securing an attachment unit to an object and a clasp assembly, according to an embodiment of the present disclosure.

FIG. 27 illustrates a flow chart of a method of securing an attachment unit to an object and a clasp assembly, according to an embodiment of the present disclosure. The method includes securing, at 800, one or more portions of the attachment unit to the object; and, at 802, one or both of mechanically or magnetically removably coupling the one or more portions to the clasp assembly.

In at least one example, said securing 800 the one or more portions of the attachment unit to the object includes adhesively securing a main body of the attachment unit to the object, and said one or both of mechanically or magnetically removably coupling, at 802, includes magnetically coupling the main body to a magnetic hitch of the clasp assembly.

In at least one example, said one or both of mechanically or magnetically removably coupling, at 802, includes receiving couplers of the clasp assembly within an undercut region of the attachment unit defined between a base, a neck, and a knob.

In at least one example, said securing 800 the one or more portions of the attachment unit to the object includes receiving and retaining one or more portions of one or more straps in one or more strap slots of the attachment unit. For example, said receiving and retaining includes rotating the attachment unit to secure the one or more portions of the one or more straps within the one or more strap slots.

As another example, the method may include integrally forming the one or more portions with the object.

As described herein, embodiments of the present disclosure provide effective and efficient systems and methods that allow for removable coupling between an object, such as a package or container, and a delivery device, such as a clasp assembly, grappling member, or the like of a UAV. Further, embodiments of the present disclosure provide low cost, mass manufacturable, simple-to-use, and easy-to-integrate devices for removably coupling an object to a delivery device.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An attachment unit configured to secure to an object, the attachment unit comprising:
a base configured to secure to the object;
a knob; and
a neck that connects the base to the knob,
wherein an undercut region is formed between the base, the knob, and the neck, and
wherein the attachment unit is configured to removably couple to a clasp assembly.

2. The attachment unit of claim 1, wherein the object is cargo.

3. The attachment unit of claim 1, wherein the base is configured to secure to the object through an adhesive, and wherein the attachment unit is configured to magnetically couple to a magnetic hitch of the clasp assembly.

4. The attachment unit of claim 1, wherein the base is configured to secure to the object through an adhesive.

5. The attachment unit of claim 1, further comprising a guidance member coupled to the knob.

6. The attachment unit of claim 5, wherein the guidance member is recessed within a central divot formed in the knob.

7. The attachment unit of claim 1, wherein the undercut region is configured to receive couplers of the clasp assembly.

8. The attachment unit of claim 1, further comprising one or more strap slots formed within the base, wherein the one or more strap slots are configured to receive and retain one or more portions of one or more straps, and wherein one or ramped surfaces having retainer barbs lead into the one or more strap slots.

9. The attachment unit of claim 8, wherein the attachment unit is configured to be rotated to secure the one or more portions of the one or more straps within the one or more strap slots.

10. The attachment unit of claim 1, wherein the base is integrally formed with the object.

11. The attachment unit of claim 1, wherein an upper surface of the attachment unit is within or below a plane in which an outermost upper surface of a top surface of the object resides.

12. The attachment unit of claim 1, wherein the base is configured to secure to the object via one or more straps.

13. A method of securing an attachment unit to an object and a clasp assembly, the method comprising:
securing a base of the attachment unit to the object; and
removably coupling the attachment unit to the clasp assembly, wherein said removably coupling comprises receiving couplers of the clasp assembly within an undercut region of the attachment unit defined between the base, a neck, and a knob.

14. The method of claim 13, wherein said securing comprises adhesively securing the base the attachment unit to the object, and wherein said removably coupling comprises magnetically coupling the attachment unit to a magnetic hitch of the clasp assembly.

15. The method of claim 13, wherein said securing comprises receiving and retaining one or more portions of one or more straps in one or more strap slots of the attachment unit.

16. The method of claim 15, wherein said receiving and retaining comprises rotating the attachment unit to secure the one or more portions of the one or more straps within the one or more strap slots.

17. The method of claim 13, further comprising integrally forming the base with the object.

18. A transportable system comprising:
an object; and
an attachment unit secured to the object, the attachment unit comprising:
a base secured to the object;
a knob; and
a neck that connects the base to the knob,
wherein an undercut region is formed between the base, the knob, and the neck, and
wherein the attachment unit is configured to or magnetically removably couple to a clasp assembly.

19. The transportable system of claim 18, wherein the base secures to the object through an adhesive.

20. The transportable system of claim 18, wherein the attachment unit further comprises a guidance member coupled to the knob.

21. The transportable system of claim 20, wherein the guidance member is recessed within a central divot formed in the knob.

22. The transportable system of claim 18, wherein the undercut region is configured to receive couplers of the clasp assembly.

23. The transportable system of claim 18, wherein the attachment unit further comprises one or more strap slots formed within the base, wherein the one or more strap slots are configured to receive and retain one or more portions of one or more straps, and wherein one or ramped surfaces having retainer barbs lead into the one or more strap slots.

* * * * *